(12) United States Patent  (10) Patent No.: US 7,801,923 B2
LeTourneau  (45) Date of Patent: Sep. 21, 2010

(54) METHOD AND/OR SYSTEM FOR TAGGING TREES

(75) Inventor: Jack J. LeTourneau, Ojai, CA (US)

(73) Assignee: Robert T. and Virginia T. Jenkins as Trustees of the Jenkins Family Trust, Sacramento, CA (US)

( * ) Notice: Subject to any disclaimer, the term of this patent is extended or adjusted under 35 U.S.C. 154(b) by 555 days.

(21) Appl. No.: 11/006,446

(22) Filed: Dec. 6, 2004

(65) Prior Publication Data

US 2006/0095455 A1 May 4, 2006

Related U.S. Application Data

(60) Provisional application No. 60/623,352, filed on Oct. 29, 2004.

(51) Int. Cl.
*G06F 7/00* (2006.01)
*G06F 17/30* (2006.01)
(52) U.S. Cl. .................. 707/797; 707/802; 707/812
(58) Field of Classification Search ........................ None
See application file for complete search history.

(56) References Cited

U.S. PATENT DOCUMENTS

| | | | |
|---|---|---|---|
| 4,156,910 A | 5/1979 | Barton et al. |
| 4,745,561 A | 5/1988 | Hirosawa et al. |
| 4,751,684 A | 6/1988 | Holt |
| 4,831,525 A | 5/1989 | Saito et al. |
| 4,905,138 A | 2/1990 | Bourne |
| 4,931,928 A | 6/1990 | Greenfeld |
| 4,949,388 A | 8/1990 | Bhaskaran |
| 4,989,132 A | 1/1991 | Mellender et al. |
| 4,991,087 A | 2/1991 | Burkowski et al. |
| 5,021,992 A | 6/1991 | Kondo |
| 5,191,522 A | 3/1993 | Bosco et al. |
| 5,235,701 A | 8/1993 | Ohler et al. |
| 5,265,245 A | 11/1993 | Norstrom et al. |
| 5,295,261 A | 3/1994 | Simonetti |
| 5,497,500 A | 3/1996 | Rogers et al. |
| 5,509,088 A | 4/1996 | Robson |
| 5,598,350 A | 1/1997 | Kawanishi et al. |
| 5,606,669 A | 2/1997 | Bertin et al. |
| 5,724,512 A | 3/1998 | Winterbottom |
| 5,724,576 A | 3/1998 | LeTourneau |
| 5,758,152 A | 5/1998 | LeTourneau |
| 5,781,906 A | 7/1998 | Aggarwal et al. |
| 5,787,415 A | 7/1998 | Jacobson et al. |
| 5,787,432 A | 7/1998 | LeTourneau |
| 5,796,356 A | 8/1998 | Okada et al. |
| 5,848,159 A | 12/1998 | Collins et al. |
| 5,978,790 A | 11/1999 | Buneman et al. |

(Continued)

OTHER PUBLICATIONS

"Core Technology Benchmarks A White Paper", Jul. 2002, downloaded from the internet Mar. 2, 2004.

(Continued)

*Primary Examiner*—John R. Cottingham
*Assistant Examiner*—Michael Pham
(74) *Attorney, Agent, or Firm*—Berkeley Law & Technology Group, LLP

(57) ABSTRACT

Embodiments of methods and/or systems for tagging trees are disclosed.

36 Claims, 28 Drawing Sheets

U.S. PATENT DOCUMENTS

| | | | |
|---|---|---|---|
| 5,999,926 | A | 12/1999 | Suciu |
| 6,002,879 | A | 12/1999 | Radigan et al. |
| 6,055,537 | A * | 4/2000 | LeTourneau ............... 707/101 |
| 6,141,655 | A | 10/2000 | Johnson et al. |
| 6,199,103 | B1 | 3/2001 | Sakuguchi |
| 6,236,410 | B1 | 5/2001 | Politis et al. |
| 6,289,354 | B1 | 9/2001 | Aggarwal et al. |
| 6,442,584 | B1 * | 8/2002 | Kolli et al. ................. 718/104 |
| 6,542,899 | B1 | 4/2003 | Saulpaugh et al. |
| 6,550,024 | B1 | 4/2003 | Pagurek et al. |
| 6,598,052 | B1 | 7/2003 | Saulpaugh et al. |
| 6,606,632 | B1 | 8/2003 | Saulpaugh et al. |
| 6,609,130 | B1 | 8/2003 | Saulpaugh et al. |
| 6,611,844 | B1 | 8/2003 | Saulpaugh et al. |
| 6,658,649 | B1 | 12/2003 | Bates et al. |
| 6,714,939 | B2 | 3/2004 | Saldanha et al. |
| 6,763,515 | B1 | 7/2004 | Vazquez et al. |
| 6,785,673 | B1 * | 8/2004 | Fernandez et al. ............. 707/3 |
| 6,965,990 | B2 | 11/2005 | Barsness et al. |
| 6,968,330 | B2 | 11/2005 | Edwards et al. |
| 7,051,033 | B2 | 5/2006 | Agarwal et al. |
| 7,072,904 | B2 | 7/2006 | Najork et al. |
| 7,103,838 | B1 | 9/2006 | Krishnamurthy et al. |
| 7,162,485 | B2 | 1/2007 | Gottlob et al. |
| 7,191,182 | B2 | 3/2007 | Anonsen et al. |
| 7,203,774 | B1 | 4/2007 | Zhou et al. |
| 7,287,026 | B2 | 10/2007 | Oommen |
| 7,313,563 | B2 | 12/2007 | Bordawekar et al. |
| 7,318,215 | B1 | 1/2008 | Krishnan et al. |
| 7,356,802 | B2 | 4/2008 | de Sutter et al. |
| 7,360,202 | B1 | 4/2008 | Seshadri et al. |
| 7,512,932 | B2 | 3/2009 | Davidov et al. |
| 7,561,927 | B2 | 7/2009 | Oyama et al. |
| 7,620,632 | B2 | 11/2009 | Andrews |
| 7,627,591 | B2 | 12/2009 | LeTourneau |
| 7,630,995 | B2 | 12/2009 | LeTourneau |
| 7,636,727 | B2 | 12/2009 | Schiffmann et al. |
| 2002/0040292 | A1 | 4/2002 | Marcu |
| 2002/0129129 | A1 | 9/2002 | Bloch et al. |
| 2002/0133497 | A1 | 9/2002 | Draper et al. |
| 2002/0169563 | A1 | 11/2002 | De Carvalho Ferreira |
| 2003/0041088 | A1 | 2/2003 | Wilson et al. |
| 2003/0065659 | A1 | 4/2003 | Agarwal et al. |
| 2003/0130977 | A1 | 7/2003 | Oommen |
| 2003/0167445 | A1 | 9/2003 | Su et al. |
| 2003/0195885 | A1 * | 10/2003 | Emmick et al. ................ 707/8 |
| 2003/0195890 | A1 | 10/2003 | Oommen |
| 2003/0236794 | A1 * | 12/2003 | Hostetter et al. ............ 707/101 |
| 2004/0010752 | A1 | 1/2004 | Chan et al. |
| 2004/0103105 | A1 | 5/2004 | Lindblad et al. |
| 2004/0215642 | A1 | 10/2004 | Cameron et al. |
| 2004/0239674 | A1 * | 12/2004 | Ewald et al. ................. 345/440 |
| 2004/0260683 | A1 | 12/2004 | Chan et al. |
| 2005/0027743 | A1 | 2/2005 | O'Neil et al. |
| 2005/0060332 | A1 | 3/2005 | Bernstein et al. |
| 2005/0125432 | A1 | 6/2005 | Lin et al. |
| 2005/0187900 | A1 | 8/2005 | LeTourneau |
| 2005/0267908 | A1 | 12/2005 | LeTourneau |
| 2006/0004817 | A1 * | 1/2006 | Andrews ................... 707/101 |
| 2006/0015538 | A1 | 1/2006 | LeTourneau |
| 2006/0095442 | A1 | 5/2006 | LeTourneau |
| 2006/0123029 | A1 | 6/2006 | LeTourneau |
| 2006/0129582 | A1 | 6/2006 | Schiffmann |
| 2006/0259533 | A1 | 11/2006 | LeTourneau |
| 2006/0271573 | A1 | 11/2006 | LeTourneau |
| 2007/0198538 | A1 | 8/2007 | Palacios |

OTHER PUBLICATIONS

"Origin Data, Inc. White Paper", pp. 1-13.

"The Art of Computer Programming", vol. 1 Fundamental Algorithms, Second edition, Addison-Wesley Series in *Computer Science and Information Processing*, ISBN 0-201-03809-9, Reading, Massachusetts, Copyright 1973.

"The Associative Model of Data White Paper", Lazy Software, 2000.

Apostol, "A Centennial History of the Prime Number Theorem", Engineering and Science, No. 4, 1996.

Cano et al., "Lazy Evaluation in Penniless Propagation over Join Trees", Networks, vol. 39(4), 175-185, 2002.

Cooper et al., "*Oh! Pascal!*", 1982, pp. 295-327.

Er, M.C., "Enumerating Ordered Trees Lexicographically", Computation Journal, vol. 28, Issue 5, pp. 538-542, 1985.

Hoffman et al., "Pattern Matching in Trees", Jan. 1982, ACM Press, vol. 29, Issue 1, pp. 68-95.

Kharbutli et al., "Using Prime Numbers For Cache Indexing to Eliminate Conflict Misses", 24 pages.

Kilpelainen, "Tree Matching Problems with Applications to Structured Text Databases", Ph.D. Dissertation, Department of Computer Science, University of Helsinki, Report A-1992-6, Helsinki, Finland, pp. 1-109, Nov. 1992.

Letourneau, "The Elementary Theory of Object Oriented Arithmetic", pp. 1-9, Apr. 1990.

Neven, Frank and Thomas Schwentick, "Expressive and efficient pattern languages for tree-structured data" Proceedings of the Nineteenth ACM SIGACT-SIGMOD-SIGART Symposium on Principles of Database Systems, May 2000.

Sechrest et al., "Blending Hierarchical and Attribute-Based File Naming", Distributed Computing System, 1992., Proceedings of the 12th International Conference on Jun. 9-12, 1992, pp. 572-580.

Shanmugasundaram et al., "Querying SML Views of Relational Data", Proceedings of the 27th VLDB Conference, Roma, Italy, 2001.

Sitaraman, Krishna, Ranganathan, N., and Ejnioui, Abdel, "A VLSI Architecture for Object Recognition using Tree Matching" Proceedings of the IEEE International Conference on Application-Specific Systems, Architectures, and Processors (ASAP'02) 2000.

Smorynski, Craig, "Logical Number Theory I: An Introduction", Springer-Verlag, 1991, pp, 14-23, and 305.

Somani et al., "Phased-Mission System Analysis Using Boolean Algebraic Methods", May 1994, ACM Press, vol. 22, Issue 1.

Stanat, D.F., and McAllister, D.F., "Discrete Mathematics in Computer Science", Prentice-Hall, 1977, Section 3.2, Trees, p. 131-145.

Valiente, "Algorithms on Trees and Graphs", pp. 151-251, Springer 2002.

Valiente, Gabriel, Chapter 4, "Tree Isomorphism," of Algorithms on Trees and Graphs, published by Springer, 2002.

Zaks, S., "Lexicographic Generation of Ordered Trees", The Journal of Theoretical Computer Science, vol. 10(1), pp. 63-82, 1980.

Office action: Restriction Requirement in co-pending U.S. Appl. No. 11/005,859, dated Dec. 12, 2007.

Response to Restriction Requirement in co-pending U.S. Appl. No. 11/005,859, dated Jan. 14, 2008.

Non-Final OA in co-pending U.S. Appl. No. 11/005,859, dated Mar. 21, 2008.

Preliminary Amendment in co-pending U.S. Appl. No. 11/007,139, dated Apr. 28, 2005.

Non-Final OA issued in co-pending pending U.S. Appl. No. 11/007,139 dated May 14, 2007.

Response to Non-Final OA in co-pending U.S. Appl. No. 11/007,139 dated Oct. 15, 2007.

Supplemental Amendment in co-pending U.S. Appl. No. 11/007,139 dated Oct. 17, 2007.

Non-Final OA issued in co-pending U.S. Appl. No. 11/007,139 dated Jan. 2, 2008.

Response to Non-Final OA in co-pending U.S. Appl. No. 11/007,139 dated Apr. 8, 2008.

Office action: Restriction Requirement in co-pending U.S. Appl. No. 11/006,320 dated Mar. 26, 2007.

Response to Restriction Requirement in co-pending U.S. Appl. No. 11/006,320, dated Apr. 27, 2007.

Notice of Non-Compliant Amendment in co-pending U.S. Appl. No. 11/006,320, dated Jul. 6, 2007.

Response to Notice of Non-Compliant Amendment in co-pending U.S. Appl. No. 11/006,320, dated Jul. 25, 2007.

Non-Final OA issued in co-pending U.S. Appl. No. 11/006,320 dated Oct. 1, 2007.
Response to Non-Final OA in co-pending U.S. Appl. No. 11/006,320 dated Jan. 29, 2008.
Notice of Non-Compliant Amendment in co-pending U.S. Appl. No. 11/006,320 dated Apr. 8, 2008.
Non-Final OA issued in co-pending U.S. Appl. No. 11/006,848 dated Apr. 4, 2007.
Response to Non-Final OA in co-pending U.S. Appl. No. 11/006,848, dated Oct. 3, 2007.
Supplemental Amendment in co-pending U.S. Appl. No. 11/006,848, dated Nov. 13, 2007.
Non-Final OA issued in co-pending U.S. Appl. No. 11/006,848, dated Feb. 5, 2008.
Non-Final OA issued in co-pending U.S. Appl. No. 11/006,841, dated Apr. 6, 2007.
Response to Non-Final OA in co-pending U.S. Appl. No. 11/006,841, dated Sep. 6, 2007.
Office Action: Restriction Requirement in co-pending U.S. Appl. No. 11/006,841, dated Nov. 27, 2007.
Response to Restriction Requirement in co-pending U.S. Appl. No. 11/006,841, dated Dec. 27, 2007.
Office Action: Restriction Requirement in co-pending U.S. Appl. No. 11/006,841, dated Mar. 17, 2008.
Preliminary Amendment in co-pending U.S. Appl. No. 11/006,440 dated Apr. 28, 2005.
Preliminary Amendment and Substitute Specification in co-pending U.S. Appl. No. 11/006,440 dated Oct. 5, 2006.
Office Action: Restriction Requirement in co-pending U.S. Appl. No. 11/006,440 dated Mar. 29, 2007.
Response to Restriction Requirement in co-pending U.S. Appl. No. 11/006,440 dated May 1, 2007.
Non-Final OA issued in co-pending U.S. Appl. No. 11/006,440 dated Jun. 21, 2007.
Response to Non-Final OA in co-pending U.S. Appl. No. 11/006,440 dated Nov. 20, 2007.
Final OA issued in co-pending U.S. Appl No. 11/006,440 dated Feb. 6, 2008.
Response to Final OA in co-pending U.S. Appl. No. 11/006,440 dated Apr. 7, 2008.
Office Action: Restriction Requirement in co-pending U.S. Appl. No. 11/006,842, dated Jan. 23, 2008.
Response to Restriction Requirement in co-pending U.S. Appl. No. 11/006,842, dated Feb. 25, 2008.
Office Action: Restriction Requirement in co-pending U.S. Appl. No. 11/412,417, dated Apr. 1, 2008.
Co-pending U.S. Appl. No. 11/319,758, filed Dec. 2005.
Co-pending U.S. Appl. No. 11/320,538, filed Dec. 2005.
Co-pending U.S. Appl. No. 11/480,094, filed Jun. 2006.
Non-Final OA issued in co-pending U.S. Appl. No. 11/385,257, dated Apr. 29, 2008.
Response to Notice of Non-Compliant Amendment in co-pending U.S. Appl. No. 11/006,320 dated May 5, 2008.
Advisory Action issued in co-pending U.S. Appl. No. 11/006,440 dated May 9, 2008.
Preliminary Amendment in co-pending U.S. Appl. No. 11/005,859, dated May 2, 2005.
Preliminary Amendment in co-pending U.S. Appl. No. 11/006,320 dated May 9, 2005.
Preliminary Amendment in co-pending U.S. Appl. No. 11/006,848, dated May 3, 2005.
Johnston et al. Advances in Dataflow Programming Languages, ACM Computing Surveys, vol. 36, No. 1, pp. 1-34, 2004.
Navarro, "A Guided Tour to Approximate String Matching", ACM Computing Surveys, vol. 33, No. 1, pp. 31-88, 2001.
Reiss, "Semantics-Based Code Search", IEEE ICSE, pp. 243-253, 2009.
Talukdar, "Learning to Create Data-Integrating Queries", ACM PVLDB, pp. 785-796, 2008.
Examiner's Interview Summary mailed Oct. 27, 2009 in U.S. Appl. No. 11/005,859, 3 pages.
Amendment After Final filed Dec. 8, 2009 in U.S. Appl. No. 11/005,859, 87 pages.
Amendment After Final filed Dec. 4, 2009 in U.S. Appl. No. 11/007,139, 25 pages.
Advisory action mailed Dec. 14, 2009 in U.S. Appl. No. 11/007,139, 4 pages.
Amendment After Final filed Nov. 30, 2009 in U.S. Appl. No. 11/006,320, 8 pages.
Office action mailed Dec. 4, 2009 in U.S. Appl. No. 11/006,320, 13 pages.
Issue Notification mailed Oct. 28, 2009 in U.S. Appl. No. 11/006,848, 1 page.
Patent Application filed Oct. 5, 2009 in co-pending U.S. Appl. No. 12/573,829, 59 pages.
Preliminary Amendment filed Dec. 21, 2009 in co-pending U.S. Appl. No. 12/573,829, 19 pages.
Letter re IDS considered by Examiner mailed Oct. 21, 2009 in U.S. Appl. No. 11/006,841, 5 pages.
Issue Notification mailed Nov. 11, 2009 in U.S. Appl. No. 11/006,841, 1 page.
Patent Application filed Oct. 13, 2009 in co-pending U.S. Appl. No. 12/578,411, 65 pages.
Letter re IDS considered by Examiner mailed Oct. 21, 2009 in U.S. Appl. No. 11/006,440, 5 pages.
Issue Fee filed Nov. 2, 2009 in U.S. Appl. No. 11/006,440, 12 pages.
Notice of Non-Compliant IDS mailed Nov. 12, 2009 in U.S. Appl. No. 11/006,440, 1 page.
Issue Notification mailed Dec. 2, 2009 in U.S. Appl. No. 11/006,440, 1 page.
Patent Application and Preliminary Amendment filed Nov. 30, 2009 in co-pending U.S. Appl. No. 12/627,816, 86 pages.
Letter re IDS considered by Examiner mailed Oct. 22, 2009 in U.S. Appl. No. 11/006,842, 4 pages.
Issue Fee filed Oct. 27, 2009 in U.S. Appl. No. 11/006,842, 1 page.
Notice of Non-Compliant IDS mailed Nov. 3, 2009 in U.S. Appl. No. 11/006,842, 1 page.
Patent Application filed Nov. 5, 2009 in co-pending U.S. Appl. No. 12/613,450, 55 pages.
Final Office action mailed Nov. 2, 2009 in U.S. Appl. No. 11/320,538, 20 pages.
Notice of Allowance mailed Dec. 11, 2009 in U.S. Appl. No. 11/361,500, 14 pages.
Examiner's Interview Summary mailed Oct. 30, 2009 in U.S. Appl. No. 11/412,417, 3 pages.
Response filed Oct. 30, 2009 in U.S. Appl. No. 11/412,417, 30 pages.
Request for Continued Examination and Amendment filed Dec. 28, 2009 in U.S. Appl. No. 11/480,094, 36 pages.
ACM Portal Search Results (Kleene and prime and enumeration and operation and natural and numerals and sequences and "enumeration operation") conducted by Examiner on Jul. 18, 2009, 6 pages.
ACM Portal Search Results (Kleene and prime and enumeration and operation and natural and numerals and sequences and enumeration and operation) conducted by Examiner on Jul. 18, 2009, 1 page.
Google Search (Kleene prime enumeration operation) conducted by Examiner on Jul. 18, 2009, 2 pages.
Google search (Kleene prime enumeration operation natural numerals sequences "Kleene prime") conducted by Examiner on Jul. 18, 2009, 2 pages.
Google Search (Kleene prime enumeration operation natural numerals sequences "enumeration operation") conducted by Examiner on Jul. 18, 2009, 2 pages.
Iacob et al., "XPath Extension for Querying Concurrent XML Markup", Technical Report #TR 394-04, Department of Computer Science, University of Kentucky, Lexington, KY 40506, Mar. 6, 2004, 15 pages.
IEEE Explore Digital Library Search Result conducted by Examiner on Jul. 18, 2009, 1 page.
Leinonen et al., "Automation of Document Structure Transformations", Auditorium, Microteknia Building, University of Kuopio, Nov. 5, 2004, 68 pages.
Lerman et al., "Learning the Common Structure of Data", American Association for Artificial Intelligence, AAAI-00 Proceedings, www.aaai.org, Apr. 13, 2000, 6 pages.
Wu, "A Prime Number Labeling Scheme for Dynamic Ordered XML Trees", IEEE, 2004, 13 pages.

Response filed Jul. 21, 2008 in co-pending U.S. Appl. No. 11/005,859, 86 pages.
Final Office Action mailed Oct. 30, 2008 in co-pending U.S. Appl. No. 11/005,859, 14 pages.
Response filed Dec. 30, 2008 in co-pending U.S. Appl. No. 11/005,859, 82 pages.
Advisory Action mailed Jan. 13, 2009 in co-pending U.S. Appl. No. 11/005,859, 3 pages.
RCE and Amendment filed Apr. 30, 2009 in co-pending U.S. Appl. No. 11/005,859, 86 pages.
Final Office action mailed Jul. 8, 2009 in co-pending U.S. Appl. No. 11/005,859, 8 pages.
Final Office action mailed Aug. 15, 2008 in co-pending U.S. Appl. No. 11/007,139, 22 pages.
Response filed Oct. 15, 2008 in co-pending U.S. Appl. No. 11/007,139, 23 pages.
Advisory action mailed Oct. 22, 2008 in co-pending U.S. Appl. No. 11/007,139, 26 pages.
RCE and Amendment filed Nov. 14, 2008 in co-pending U.S. Appl. No. 11/007,139, 27 pages.
Office action mailed Dec. 8, 2008 in co-pending U.S. Appl. No. 11/007,139, 17 pages.
Amendment filed May 8, 2009 in co-pending U.S. Appl. No. 11/007,139, 26 pages.
Final Office action mailed Aug. 4, 2009 in co-pending U.S. Appl. No. 11/007,139, 18 pages.
Non-Final OA mailed Aug. 15, 2008 in co-pending U.S. Appl. No. 11/006,320, 19 pages.
Response to Non-Final OA filed Nov. 14, 2008 in co-pending U.S. Appl. No. 11/006,320, 37 pages.
Notice of Non-Compliant Amendment mailed Jan. 27, 2009 in co-pending U.S. Appl. No. 11/006,320, 2 pages.
Amendment filed Apr. 27, 2009 in co-pending U.S. Appl. No. 11/006,320, 39 pages.
Final Office action mailed Jul. 29, 2009 in co-pending U.S. Appl. No. 11/006,320, 7 pages.
Response filed Aug. 4, 2008 in co-pending U.S. Appl. No. 11/006,848, 27 pages.
Final Office action mailed Dec. 2, 2008 in co-pending U.S. Appl. No. 11/006,848, 30 pages.
RCE and Amendment filed May 4, 2009 in co-pending U.S. Appl. No. 11/006,848, 24 pages.
Notice of Allowance mailed Jun. 11, 2009 in co-pending U.S. Appl. No. 11/006,848, 8 pages.
Issue Fee filed Sep. 11, 2009 in co-pending U.S. Appl. No. 11/006,848, 10 pages.
Response to Restriction Requirement filed Jul. 17, 2008 in co-pending U.S. Appl. No. 11/006,841, 33 pages.
Final Office Action, mailed Oct. 29, 2008 in co-pending U.S. Appl. No. 11/006,841, 54 pages.
Response filed Dec. 29, 2008 in co-pending U.S. Appl. No. 11/006,841, 45 pages.
Advisory Action mailed Jan. 6, 2009 in co-pending U.S. Appl. No. 11/006,841, 3 pages.
RCE and Amendment filed Apr. 23, 2009 in co-pending U.S. Appl. No. 11/006,841, 48 pages.
Supplemental Response filed Jun. 26, 2009 in co-pending U.S. Appl. No. 11/006,841, 34 pages.
Notice of Allowance mailed Jun. 29, 2009 in co-pending U.S. Appl. No. 11/006,841, 40 pages.
Issue Fee filed Sep. 29, 2009 in co-pending U.S. Appl. No. 11/006,841, 4 pages.
Notice of Appeal filed Aug. 4, 2008 in co-pending U.S. Appl. No. 11/006,440, 1 page.
Final Office action mailed Jan. 23, 2009 in co-pending U.S. Appl. No. 11/006,440, 22 pages.
RCE and Amendment filed Nov. 4, 2008 in co-pending U.S. Appl. No. 11/006,440, 39 pages.
Amendment After Final filed Apr. 23, 2009 in co-pending U.S. Appl. No. 11/006,440, 34 pages.
Supplemental Amendment filed Jul. 17, 2009 in co-pending U.S. Appl. No. 11/006,440, 29 pages.
Notice of Allowance mailed Jul. 31, 2009 in co-pending U.S. Appl. No. 11/006,440, 15 pages.
Examiner's Amendment and Reasons for Allowance mailed Sep. 3, 2009 in co-pending U.S. Appl. No. 11/006,440, 9 pages.
Amendment filed Jul. 29, 2008 in co-pending U.S. Appl. No. 11/385,257, 26 pages.
Final Office action mailed Dec. 9, 2008 in co-pending U.S. Appl. No. 11/385,257, 35 pages.
RCE and Amendment filed May 11, 2009 in co-pending U.S. Appl. No. 11/385,257, 33 pages.
Supplemental Response filed May 26, 2009 in co-pending U.S. Appl. No. 11/385,257, 3 pages.
Notice of Non-Compliant Amendment mailed Jun. 1, 2009 in co-pending U.S. Appl. No. 11/385,257, 3 pages.
Response filed Jun. 30, 2009 in co-pending U.S. Appl. No. 11/385,257, 31 pages.
Office action mailed Sep. 14, 2009 in co-pending U.S. Appl. No. 11/385,257, 37 pages.
Office action mailed Nov. 12, 2008 in co-pending U.S. Appl. No. 11/319,758, 30 pages.
Amendment filed May 12, 2009 in co-pending U.S. Appl. No. 11/319,758, 35 pages.
Final Office action mailed Aug. 3, 2009 in co-pending U.S. Appl. No. 11/319,758, 35 pages.
Office action: Restriction Requirement mailed May 13, 2008 in co-pending U.S. Appl. No. 11/006,842, 5 pages.
Response to Restriction Requirement filed Aug. 13, 2008 in co-pending U.S. Appl. No. 11/006,842, 24 pages.
Office action mailed Nov. 3, 2008 in co-pending U.S. Appl. No. 11/006,842, 21 pages.
Response filed May 4, 2009 in co-pending U.S. Appl. No. 11/006,842, 35 pages.
Supplemental Response filed Jul. 17, 2009 in co-pending U.S. Appl. No. 11/006,842, 23 pages.
Notice of Allowance mailed Jul. 27, 2009 in co-pending U.S. Appl. No. 11/006,842, 13 pages.
Office action mailed Apr. 1, 2009 in co-pending U.S. Appl. No. 11/320,538, 18 pages.
Response filed Jul. 1, 2009 in co-pending U.S. Appl. No. 11/320,538, 26 pages.
Office action mailed May 27, 2009 in co-pending U.S. Appl. No. 11/361,500, 24 pages.
Response filed Aug. 27, 2009 in co-pending U.S. Appl. No. 11/361,500, 36 pages.
Amendment filed Aug. 1, 2008 in co-pending U.S. Appl. No. 11/412,417, 27 pages.
Final Office action mailed Nov. 13, 2008 in co-pending U.S. Appl. No. 11/412,417, 34 pages.
RCE and Amendment filed May 12, 2009 in co-pending U.S. Appl. No. 11/412,417, 31 pages.
Office action mailed Jun. 30, 2009 in co-pending U.S. Appl. No. 11/412,417, 34 pages.
Office action mailed Nov. 7, 2008 in co-pending U.S. Appl. No. 11/480,094, 19 pages.
Amendment filed May 7, 2009 in co-pending U.S. Appl. No. 11/480,094, 33 pages.
Final Office action mailed Jul. 28, 2009 in co-pending U.S. Appl. No. 11/480,094, 12 pages.

* cited by examiner

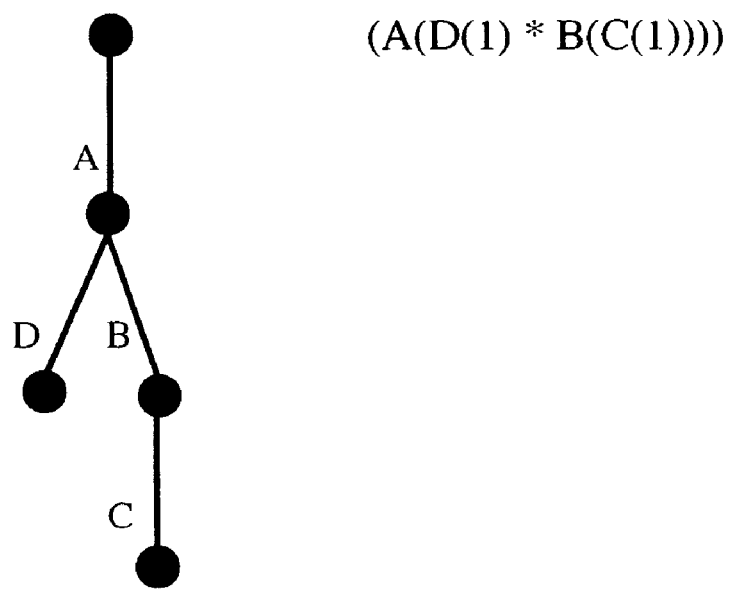
(A(D(1) * B(C(1))))
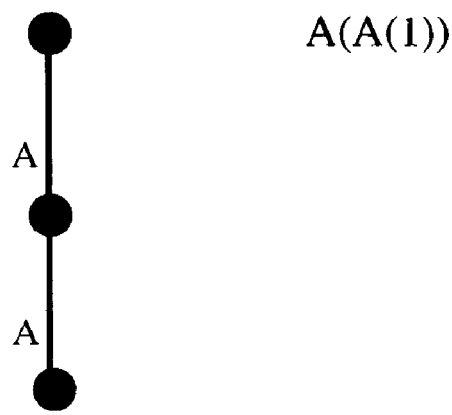
A(A(1))
D(1)
200  *Fig. 2*

$Q(0) \Rightarrow 2$ $Q(1) \Rightarrow 3$ $Q(2) \Rightarrow 5$ $Q(3) \Rightarrow 7$ $Q(4) \Rightarrow 11$ $Q(5) \Rightarrow 13$ $Q(6) \Rightarrow 17$ $Q(7) \Rightarrow 19$ $Q(8) \Rightarrow 23$ $Q(9) \Rightarrow 29$ $Q(10) \Rightarrow 31$ $Q(11) \Rightarrow 37$ $Q(12) \Rightarrow 41$

Finite Rooted Unordered 2 Valued Edge-Labeled Trees

*Signature* = < 2 , 2 , 1 >
*Alphabet* = {0, 1, A, B, * }

Expressions $$(x * y) = (y * x);$$
$$((x * y) * z) = (x * (y * z));$$

$$(0 * x) = 0;$$
$$(1 * x) = x;$$

$$A(0) = 1;$$
$$B(0) = 1.$$

Core Model Isomorph (based upon the natural number universe)

$$A(x) = Q(2x - 2), x \text{ not } 0;$$
$$B(x) = Q(2x - 1), x \text{ not } 0;$$

$$(x * y) = (x \text{ multiplied by } y).$$

Finite Rooted Unordered 3 Valued Edge-Labeled Trees

*Signature* = $<2, 3, 1>$
*Alphabet* = $\{0, 1, A, B, C, *\}$

Expressions $$(x * y) = (y * x);$$
$$((x * y) * z) = (x * (y * z));$$

$$(0 * x) = 0;$$
$$(1 * x) = x;$$

$$A(0) = 1;$$
$$B(0) = 1;$$
$$C(0) = 1.$$

Core Model Isomorph (based upon the natural number universe)

$$A(x) = Q(3x - 3), x \text{ not } 0;$$
$$B(x) = Q(3x - 2), x \text{ not } 0;$$
$$C(x) = Q(3x - 1), x \text{ not } 0;$$

$$(x * y) = (x \text{ multiplied by } y).$$

Fig. 8

Finite Rooted Unordered 4 Valued Edge-Labeled Trees
*Signature* = < 2 , 4 , 1 >
*Alphabet* = {0, 1, A, B, C, D, * }
*Expressions*
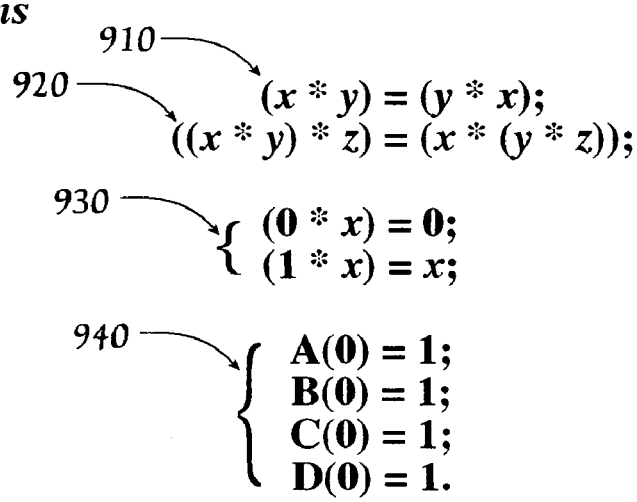
910 → (x * y) = (y * x);
920 → ((x * y) * z) = (x * (y * z));
930 → { (0 * x) = 0;
        (1 * x) = x;
940 → { A(0) = 1;
        B(0) = 1;
        C(0) = 1;
        D(0) = 1.
*Core Model Isomorph (based upon the natural number universe)*
$A(x) = Q(4x - 4)$, x not 0;
$B(x) = Q(4x - 3)$, x not 0;
$C(x) = Q(4x - 2)$, x not 0;
$D(x) = Q(4x - 1)$, x not 0;
(x * y) = (x multiplied by y).
900  Fig. 9

Finite Rooted Unordered 5 Valued Edge-Labeled Trees

*Signature* = < 2 , 5 , 1 >
*Alphabet* = {0, 1, A, B, C, D, E * }

*Expressions*

$$(x * y) = (y * x);$$
$$((x * y) * z) = (x * (y * z));$$

$$(0 * x) = 0;$$
$$(1 * x) = x;$$

$$A(0) = 1;$$
$$B(0) = 1;$$
$$C(0) = 1;$$
$$D(0) = 1;$$
$$E(0) = 1.$$

*Core Model Isomorph (based upon the natural number universe)*

$$A(x) = Q(5x - 5), x \text{ not } 0;$$
$$B(x) = Q(5x - 4), x \text{ not } 0;$$
$$C(x) = Q(5x - 3), x \text{ not } 0;$$
$$D(x) = Q(5x - 2), x \text{ not } 0;$$
$$E(x) = Q(5x - 1), x \text{ not } 0;$$

$$(x * y) = (x \text{ multiplied by } y).$$

Fig. 10

Finite Rooted Unordered 6 Valued Edge-Labeled Trees

*Signature* = < 2 , 6 , 1 >
*Alphabet* = {0, 1, A, B, C, D, E, F *}

*Expressions*

$$(x * y) = (y * x);$$
$$((x * y) * z) = (x * (y * z));$$

$$(0 * x) = 0;$$
$$(1 * x) = x;$$

$$A(0) = 1;$$
$$B(0) = 1;$$
$$C(0) = 1;$$
$$D(0) = 1;$$
$$E(0) = 1;$$
$$F(0) = 1.$$

*Core Model Isomorph (based upon the natural number universe)*

$$A(x) = Q(6x - 6), x \text{ not } 0;$$
$$B(x) = Q(6x - 5), x \text{ not } 0;$$
$$C(x) = Q(6x - 4), x \text{ not } 0;$$
$$D(x) = Q(6x - 3), x \text{ not } 0;$$
$$E(x) = Q(6x - 2), x \text{ not } 0;$$
$$F(x) = Q(6x - 1), x \text{ not } 0;$$

$$(x * y) = (x \text{ multiplied by } y).$$

| | 2-ary | 3-ary | 4-ary | 5-ary | 6-ary |
|---|---|---|---|---|---|
| 0 | ○ | ⊢----------------------------------------→ | | | |
| 1 | ● | ⊢----------------------------------------→ | | | |
| 2 | A│ | ⊢----------------------------------------→ | | | |
| 3 | B│ | ⊢----------------------------------------→ | | | |
| 4 | A∧A | ⊢----------------------------------------→ | | | |
| 5 | A│ A│ | C│ | ⊢------------------------------→ | | |
| 6 | A∧B | ⊢----------------------------------------→ | | | |
| 7 | B│ A│ | A│ A│ | D│ | ⊢------------------→ | |
| 8 | A∧A∧A | ⊢----------------------------------------→ | | | |
| 9 | B∧B | ⊢----------------------------------------→ | | | |
| 10 | A∧A A│ | A∧C | ⊢------------------------------→ | | |

| Natural # | BEL Trees |
|---|---|
| 0 |  |
| 1 |  |
| 2 |  |
| 3 |  |
| 4 | 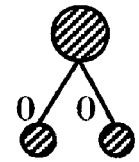 |
| 5 | 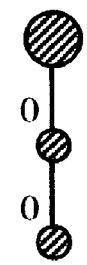 |
| 6 | 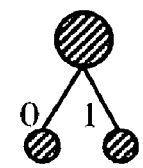 |
*Fig. 16*

Index Table (0-23)

Rule A (Boolean)
1810
$$[0] \Rightarrow \quad ;$$
$$[1] \Rightarrow [\_];$$

Rule B (Even)
1820
$$[2x] \Rightarrow [\_]\_[x];$$

Rule C (Odd Non-Composite)
1830
$$[Q(x)] \Rightarrow [\_[x]\_];$$

Rule D (Odd Composite)
1840
$$[x*y] \Rightarrow [x]\_[y].$$

Fig. 18

| Numbers, N(x) | Strings, S(x) |
|---|---|
| 0 | |
| 1 | [ ] |
| 2 | [ ][ ] |
| 3 | [[ ]] |
| 4 | [ ][ ][ ] |
| 5 | [[ ][ ]] |
| 6 | [ ][[ ]] |
| 7 | [[[ ]]] |
| 8 | [ ][ ][ ][ ] |
| 9 | [[ ]][[ ]] |
| 10 | [ ][[ ][ ]] |
| 11 | [[ ][ ][ ]] |
| 12 | [ ][ ][[ ]] |
| 13 | [[[ ][ ]]] |
| 14 | [ ][[[ ]]] |
| 15 | [[ ]][[ ][ ]] |
| 16 | [ ][ ][ ][ ][ ] |
| 17 | [[ ][[ ]]] |
| 18 | [ ][[ ]][[ ]] |
| 19 | [[[[ ]]]] |
| 20 | [ ][ ][[ ][ ]] |
| 21 | [[ ]][[[ ]]] |
| 22 | [ ][[ ][ ][ ]] |
| 23 | [[ ][ ][ ][ ]] |

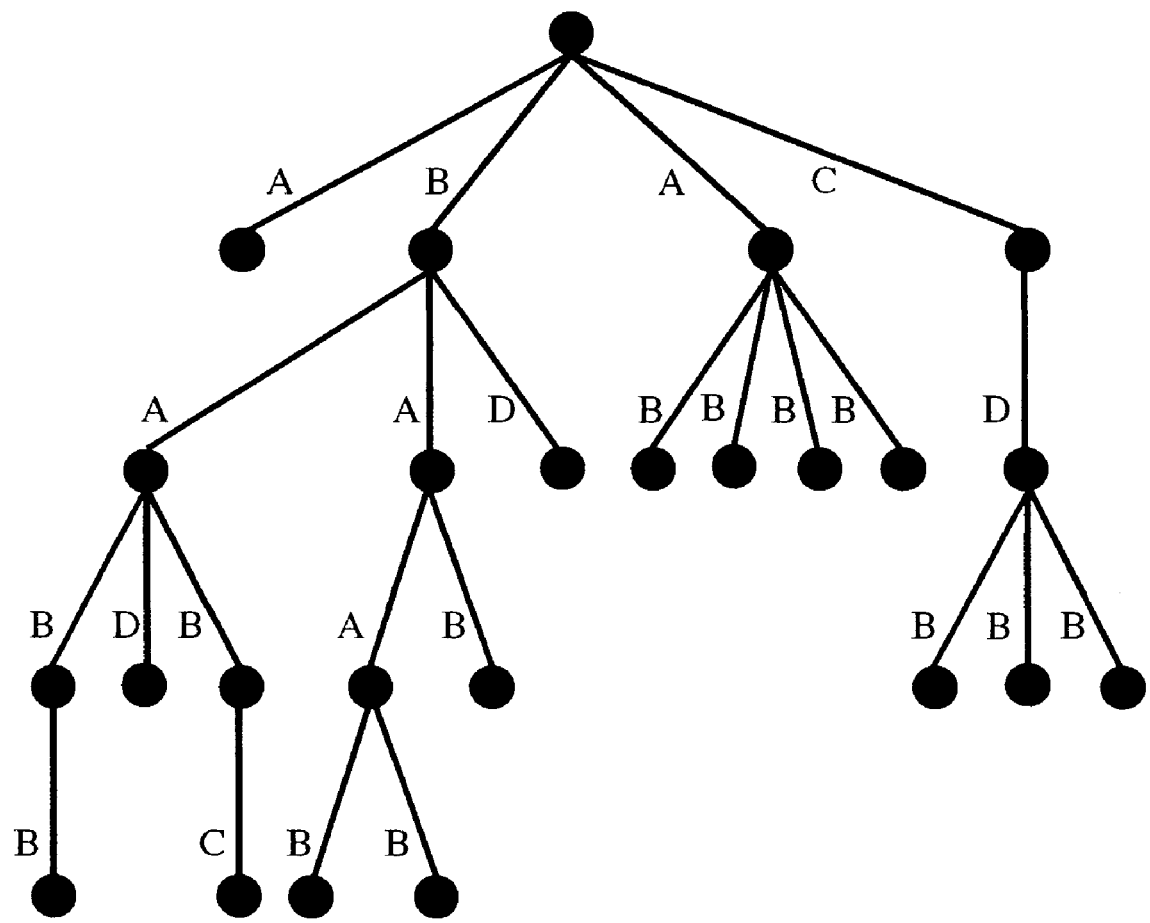
2800  *Fig. 28*

METHOD AND/OR SYSTEM FOR TAGGING TREES

This disclosure claims priority pursuant to 35 USC 119(e) from U.S. Provisional Pat. Appl. Ser. No. 60/623,352, filed on Oct. 29, 2004, by J. J. LeTourneau, titled "METHOD AND/OR SYSTEM FOR TAGGING TREES," assigned to the assignee of claimed subject matter.

BACKGROUND

This disclosure is related to navigating trees.

In a variety of fields, data or a set of data, may be represented in a hierarchical fashion. This form of representation may, for example, convey information, such as particular relationships or patterns between particular pieces of data or groups of data and the like. However, manipulating and/or even recognizing specific data representations or patterns is not straight-forward, particularly where the data is arranged in a complex hierarchy. Without loss of generality, examples may include a database, and further, without limitation, a relational database. Techniques for performing operations on such databases or recognizing specific patterns, for example, are computationally complex, time consuming, and/or otherwise cumbersome. A need, therefore, continues to exist for improved techniques for performing such operations and/or recognizing such patterns.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

FIG. 2 is a schematic diagram of embodiments of several unordered edge-labeled trees and symbolic expressions mathematically representing the tree embodiments;

FIG. 6 is a table providing an embodiment of a function that relates natural numerals to composite numerals;

FIG. 7 is a table providing symbolic expressions for an embodiment of rooted, unordered, 2-valued edge-labeled trees;

FIG. 8 is a table providing symbolic expressions for an embodiment of rooted, unordered, 3-valued edge-labeled trees;

FIG. 9 is a table providing symbolic expressions for an embodiment of rooted, unordered, 4-valued edge-labeled trees;

FIG. 10 is a table providing symbolic expressions for an embodiment of rooted, unordered, 5-valued edge-labeled trees;

FIG. 11 is a table providing symbolic expressions for an embodiment of rooted, unordered, 6-valued edge-labeled trees;

FIGS. 12 and 13 provide an embodiment of a table relating the natural numerals and embodiments of different tree views;

FIG. 16 is a table illustrating an embodiment of a relationship between BELTs and natural numerals;

FIG. 18 is a table illustrating an embodiment of a set of rules to covert natural numerals to strings;

FIG. 19 is a table illustrating an embodiment of an association between natural numerals and a set of strings;

FIGS. 25-28 are a sequence of operations illustrating a technique to implement another embodiment of a method of tagging a tree.

DETAILED DESCRIPTION

Figure 1:
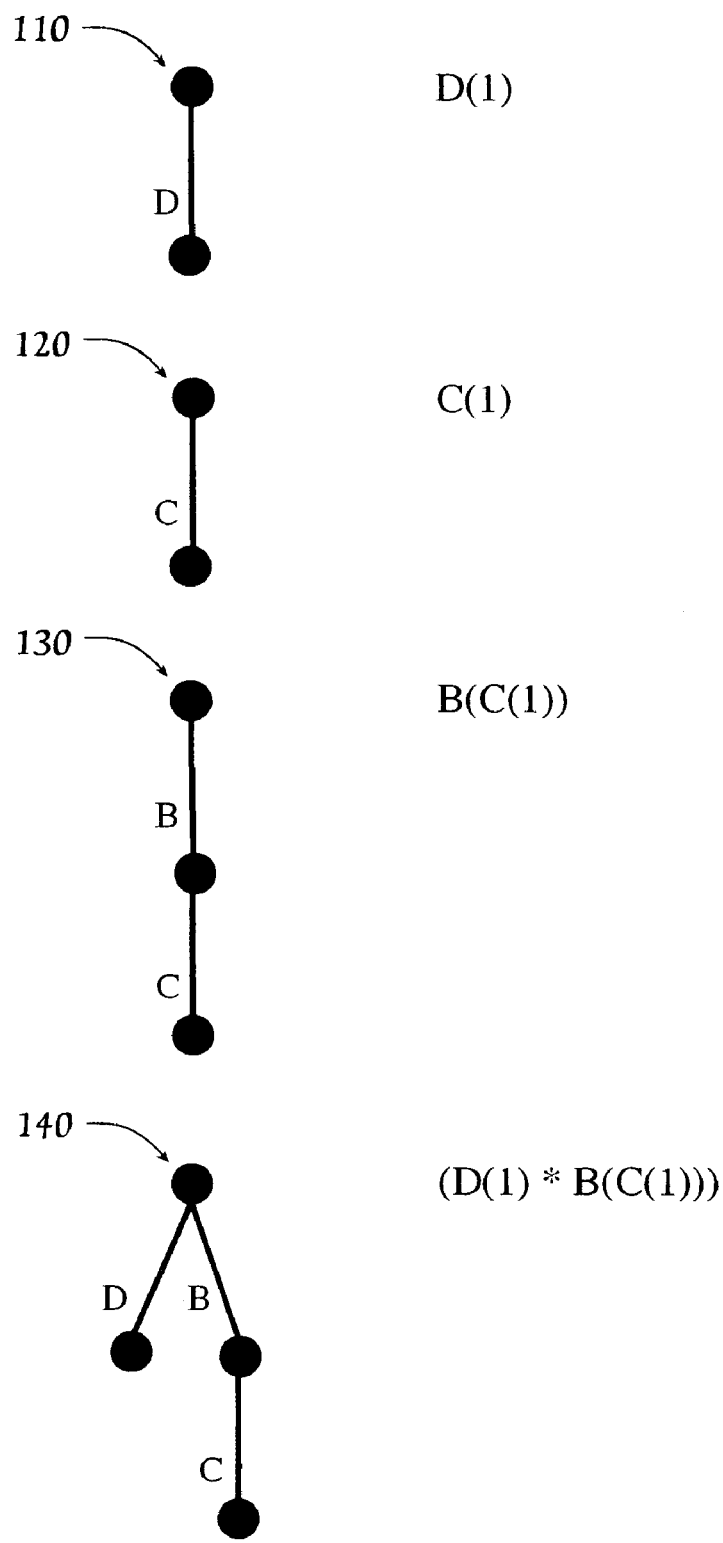
FIG. 1 is a schematic diagram of embodiments of several unordered edge-labeled trees and symbolic expressions mathematically representing the tree embodiments.

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the detailed description which follow are presented in terms of algorithms and/or symbolic representations of operations on data bits or binary digital signals stored within a computing system, such as within a computer or computing system memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices.

In a variety of fields, data or a set of data, may be represented in a hierarchical fashion. This form of representation may, for example, convey information, such as particular relationships or patterns between particular pieces of data or groups of data and the like. However, manipulating and/or even recognizing specific data representations or patterns is not straight-forward, particularly where the data is arranged in a complex hierarchy. Without loss of generality, examples may include a database and further, without limitation, a relational database. Techniques for performing operations on such databases or recognizing specific patterns, for example, are computationally complex, time consuming, and/or otherwise cumbersome. A need, therefore, continues to exist for improved techniques for performing such operations and/or recognizing such patterns.

As previously discussed, in a variety of fields, it is convenient and/or desirable to represent data, a set of data and/or other information in a hierarchical fashion. In this context, such a hierarchy of data shall be referred to as a "tree." In a particular embodiment, a tree may comprise a finite, rooted, connected, acyclic graph. Likewise, such trees may be either ordered or unordered. Here, ordered refers to the notion that there is an ordering or precedence among nodes attached to a common node corresponding to the order of the attached nodes shown in a graphical illustration. An unordered tree is illustrated here, for example, in FIG. 15 by embodiment 100. As illustrated, the root of this particular embodiment encompasses node 105. In addition to 105, there are eight other nodes designated 110 to 145, respectively. Likewise, the nodes are connected by branches referred to, in this context, as edges. Thus, the nodes of this tree are connected by eight edges. This embodiment, therefore, illustrates a finite tree that is rooted by node 105. Furthermore, the nodes are connected, meaning, in this context, that a path exists between any two nodes of the tree. The tree is likewise acyclic, meaning here, that no path in the tree forms a complete loop.

Figure 15:
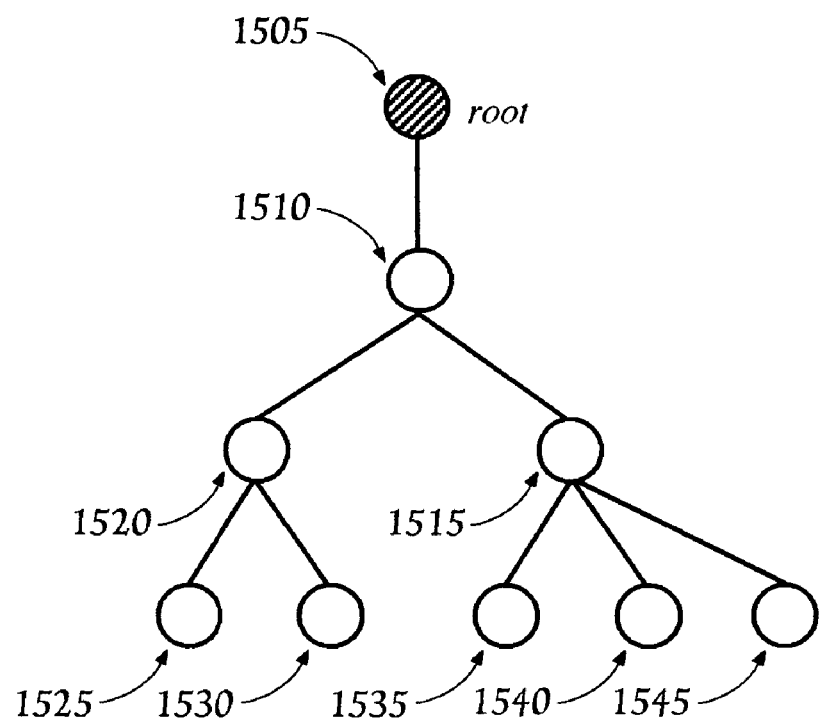
FIG. 15 is a schematic diagram of an unordered edge labeled tree.

As previously suggested, in a variety of contexts, it may be convenient and/or desirable to represent a hierarchy of data and/or other information using a structure, such as the embodiment illustrated in FIG. 15. One particular embodiment, without loss of generality, of a tree may include edges that are labeled with data and/or other values. Likewise, in one particular embodiment, such data and/or values may be limited to a particular set of data. For example, in this context, a binary edge labeled tree refers to a tree in which the data and/or values comprise binary data, that is, in this example, either a binary one or a binary zero. Likewise, alternatively, the edges of a tree may be labeled with three values, such as 0, 1, 2. Continuing, the edges may be labeled with four values, five values, etc. In this context, the class of all trees in which the edges are labeled with a specific number of distinct values, that is, in this context, values chosen from a set having a specific number of distinct elements, shall be referred to as edge-labeled trees (ELTs). It is likewise noted that such trees are not limited to being labeled with the numerals previously described. Any distinctly identifiable labels may be employed; however, in this context, it shall be understood that employing numerals to label the edges is sufficiently general to encompass any sort of data labels that may be desirable, regardless of their form.

To reiterate, in this context, a tree comprises an edge labeled tree if each edge of the string or tree respectively stores a value or single piece of data. Likewise, in this context, two nodes are employed to support an edge holding a single piece of data. At this point, it is worth noting that trees having nodes and edges, such as previously described, may be represented in a computing platform or similar computing device through a data structure or a similar mechanism intended to capture the hierarchical relationship of the data, for example. It is intended that all such embodiments are included within the scope of the claimed subject matter.

It is noted that binary edge labeled trees (BELTs) may be listed or enumerated. See, for example, U.S. provisional patent application Ser. No. 60/543,371, titled "Manipulating Sets of Hierarchical Data," filed on Feb. 9, 2004, by J. J. LeTourneau, and assigned to the assignee of the current provisional application. This is illustrated, here, for example, in FIG. 16. It is noted that this particular figure also includes the associated natural numerals. The association of such numerals for this particular embodiment should be clear based at least in part on previously cited U.S. provisional patent application Ser. No. 60/543,371. However, it is, of course, again noted that the claimed subject matter is not limited in scope to employing the approach or approaches described in aforementioned U.S. provisional patent application Ser. No. 60/543,371. U.S. provisional patent application Ser. No. 60/543,371 is provided simply as an example of listing or enumerating unordered BELTs.

However, for this particular embodiment, although the claimed subject matter is not limited in scope in this respect, a method of enumerating a set of unordered trees may begin with enumeration of an empty binary edge labeled tree and a one node binary edge labeled tree. Thus, the empty tree is associated with the natural numeral zero and has a symbolic representation as illustrated in FIG. 16 (circle). Likewise, the one node tree, which holds no data, is associated with the natural numeral one and has a graphical representation of a single node. For higher positive natural numbers, ordered trees may be generated by a process described, for example, in "The Lexicographic Generation of Ordered Trees," by S. Zaks, The Journal of Theoretical Computer Science, Vol. 10(1), pp 63-82, 1980, or, "Enumerating Ordered Trees Lexicographically," by M. C. Er, Computation Journal, Vol. 28, Issue 5, pp 538-542, 1985. This may be illustrated, for example in FIG. 16, as described in more detail below.

As illustrated, for this particular embodiment, and as previously described, the empty tree has zero nodes and is associated with the natural numeral zero. Likewise, the one node tree root comprises a single node and is associated with the natural numeral one. Thus, to obtain the tree at position two, a root node is attached and connected to the prior root node by an edge. Likewise, here, by convention, the edge is labeled with a binary zero. If, however, the tree formed by the immediately proceeding approach were present in the prior enumeration of trees, then a similar process embodiment is followed, but, instead, the new edge is labeled with a binary one rather than a binary zero. Thus, for example, to obtain the binary edge labeled tree for position three, a new root node is connected to the root node by an edge and that edge is labeled with a binary one.

Continuing with this example, to obtain the binary edge labeled tree for position four, observe that numeral four is the product of numeral two times numeral two. Thus, a union is formed at the root of two trees, where, here, each of those trees is associated with the positive natural numeral two. Likewise, to obtain the binary edge labeled tree for position five, begin with the binary edge labeled tree for position two and follow the previously articulated approach of adding a root and an edge and labeling it with a binary zero.

In this context, adding a root node and an edge and labeling it binary zero is referred to as a "zero-push" operation and adding a root node and an edge and labeling it binary one is referred to as a "one-push" operation. Thus, referring again to FIG. 16, the one-push of the root tree is the tree at position three. This follows from FIG. 9 of previously referenced U.S. provisional patent application Ser. No. 60/543,371, since $Q((1*2)-1)=Q(1)=3$. Likewise, the tree at position five is the zero-push of the tree at position 2. Again, this follows from FIG. 9 of the previously referenced US provisional patent application, since $Q((2*2)-2)=Q(2)=5$.

In the embodiment just described, binary edge labeled trees use binary numerals "0" and "1." However, the claimed subject matter is not limited in scope to binary edge labled trees. For example, trees may employ any number of numeral combinations as labels, such as triplets, quadruplets, etc. Thus, using a quadruplet example, it is possible to construct trees, such as a zero-push of a particular tree, a one-push of that tree, a two-push of that tree, and a three-push of that tree. Thus, for such trees, edges may be labeled 0, 1, 2 or 3, etc., as previously described and as explained in more detail hereinafter.

Figure 17:
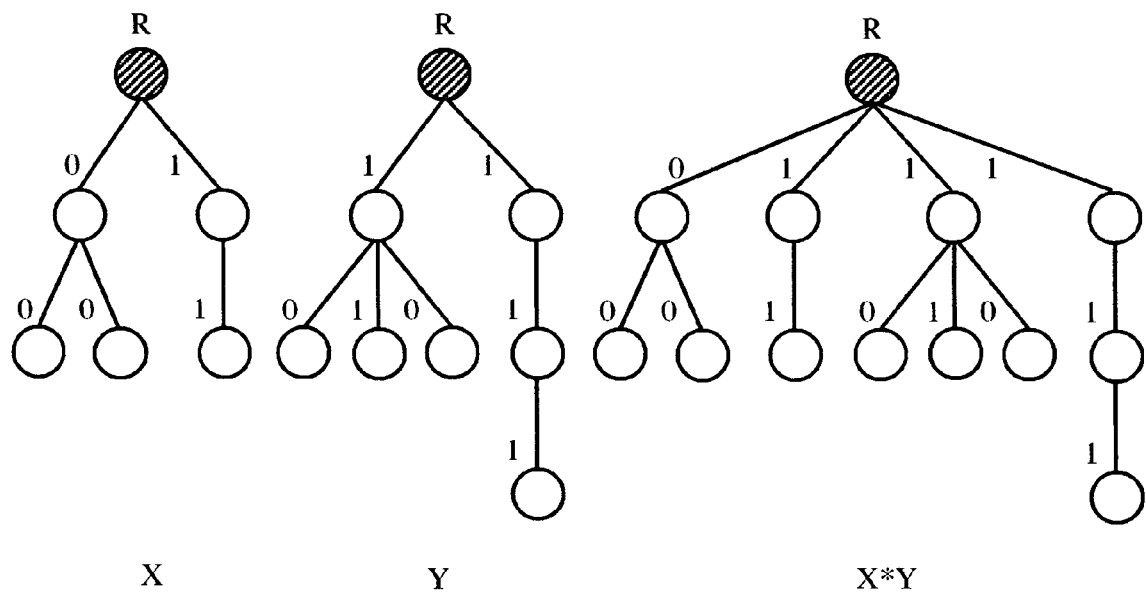
FIG. 17 is a schematic diagram illustrating an embodiment of merging two edge-labeled trees.

The foregoing discussion has begun to characterize an algebra involving trees, in this particular embodiment, an algebra for unordered edge labeled trees or unordered ELTs, such as BELTs. The foregoing discussion defines a value zero, a zero node tree for this particular embodiment, a value one, a one node tree for this particular embodiment, and a monadic operation, previously described as zero-push. For example, alternatively, a "one-push" may be employed. For this embodiment, this is analogous, for example, to the convention that "0" represent "off" and "1" represent "on." Alternatively and equivalently, "1" may be employed to represent "off," and "0" may be employed to represent "on," without loss of generality. For this particular embodiment, an additional operation may be characterized, a "merger" operation. The merger operation with respect to trees refers to merging two trees at their roots. This operation is illustrated, for example, in FIG. 17.

As will now be appreciated, the merger operation comprises a binary operator. Likewise, the constants zero/one, referred to above, may be viewed as an operation having no argument or as a zero valued argument operator or operation. Thus, this operation, in effect, returns the same value whenever applied. Here, for this particular embodiment, the constant value, or zero valued argument operation that returns "c" and is denoted as "c." The merger operator is denoted as "*".

Figure 4:
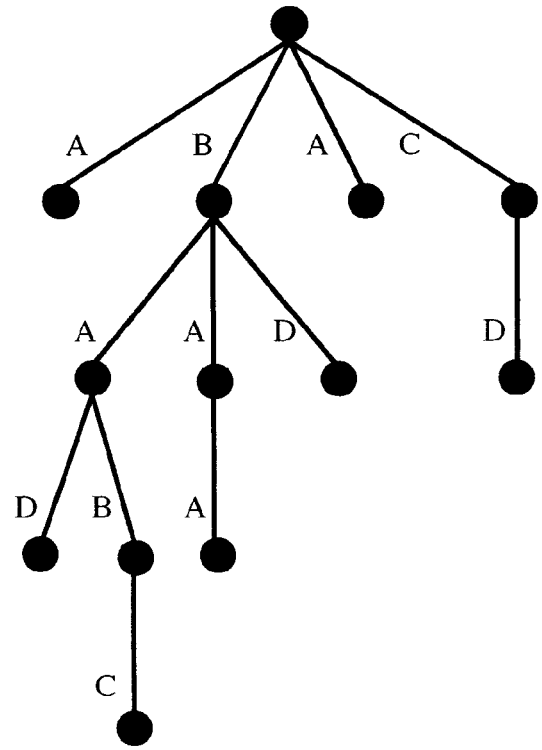
FIG. 4 is a schematic diagram illustrating an embodiment of an unordered edge-labeled tree and a symbolic expression mathematically representing the tree embodiment.

FIG. 4 is schematic diagram illustrating an embodiment of an edge labeled tree, here a 4 valued edge labeled tree. In this particular embodiment, four distinct values are employed to label the edges. Here, the labels comprising A, B, C and D, although, of course, the claimed subject matter is not limited to 4 valued edge labeled trees, to edge labeled trees, or to employing these particular edge labels. It is noted that the labels A, B, C, and D in this embodiment are similar to the labels binary 0 and binary 1 for BELTs. Below tree 400 is a symbolic expression mathematically representing tree 400. Performing the operations indicated by the expression shown in FIG. 4 below tree 400 will provide a natural numeral that corresponds, for this particular embodiment, to this particular tree, as described in more detail hereinafter.

To assist in understanding the relationship between the symbolic expression shown in FIG. 4 and tree 400, for this particular embodiment, FIG. 1 provides an embodiment 110 of another tree. As illustrated, tree 110 comprises an edge label D connecting two nodes. For this particular context, this embodiment may be expressed symbolically as follows: D(1). Thus, a technique to describe the embodiment of tree 110 would refer to the "push" of the natural number 1. Here, for this particular embodiment, this particular push operation comprises the "D" push of 1, resulting in D being the label of the edge connecting the two nodes. More specifically, as previously described, a single node comprises the natural numeral 1 in this particular embodiment. To perform a push operation, an edge is attached to that node and labeled. Here, applying a D push, the label provided comprises the label D.

Figure 3:
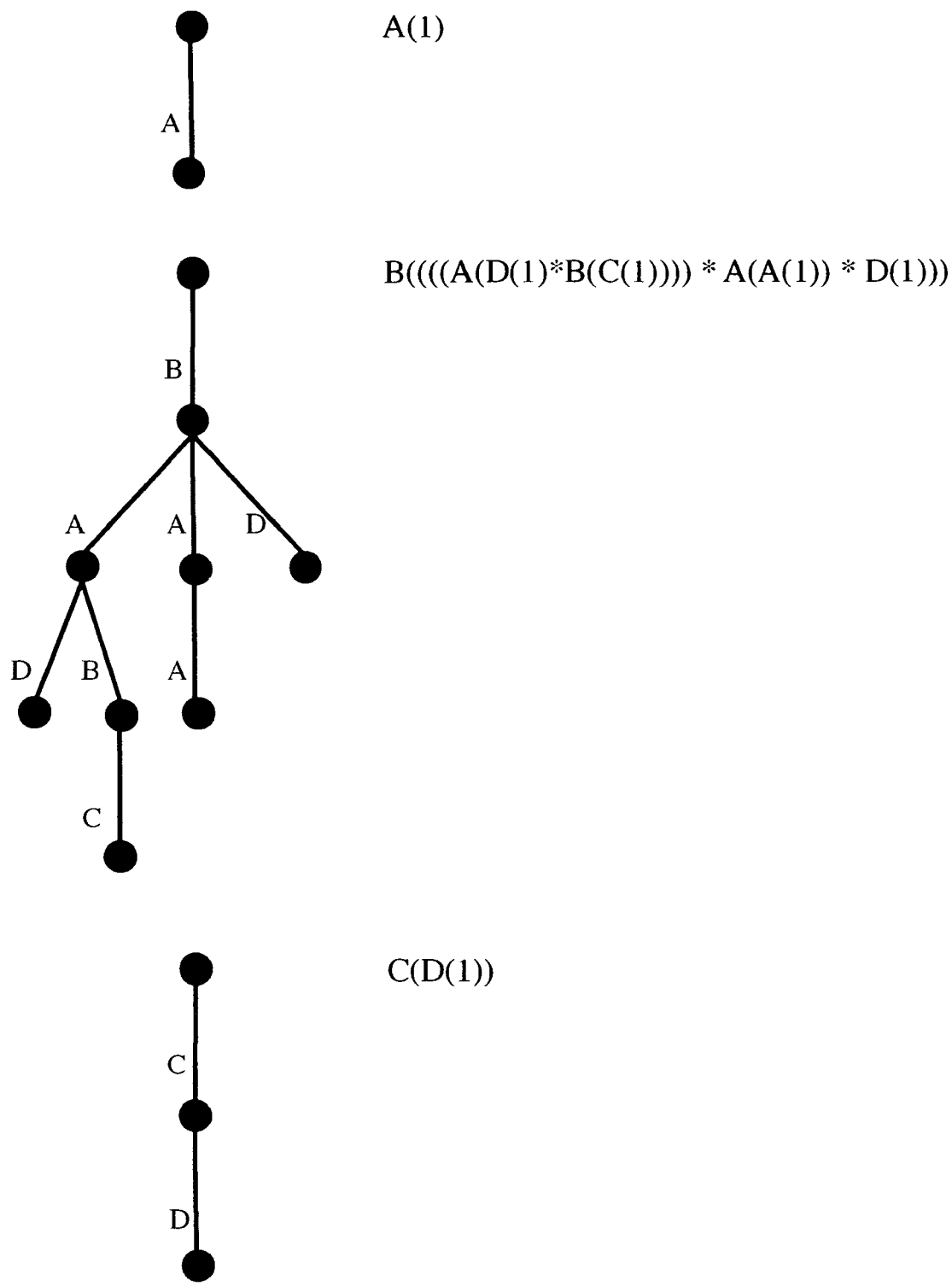
FIG. 3 is a schematic diagram of embodiments of several unordered edge-labeled trees and symbolic expressions mathematically representing the tree embodiments.

Continuing, the "C" push of "1" is illustrated as two nodes with an edge labeled C connecting the two nodes for tree embodiment 120. Applying similar reasoning provides an edge labeled tree embodiment 130 representing the following expression: B(C(1)). Likewise, for this particular embodiment, the operation of merger may be represented as "*", as previously suggested. Thus, applying a merger operation provides tree embodiment 140 at the bottom of FIG. 1 corresponding, for this particular embodiment, to the following expression: (D(1)*B(C(1))). Applying similar reasoning to FIGS. 2 and 3 and the tree embodiments shown ultimately produces tree 400 illustrated in FIG. 4, along with the corresponding symbolic expression.

As the previous discussion suggests, here A, B, C and D comprise monadic operators and the merger operation comprises a binary operation. In U.S. provisional patent application No. 60/575,784, titled "Method and/or System for Simplifying Tree Expressions, such as for Pattern Matching," filed May 28, 2004, by J. J. LeTourneau, assigned to the assignee of the current application, monadic operators similar to those described here were designed as successor operators, using the symbol S(x). Here, these monadic operators comprise multiple successive operators.

Figure 5:
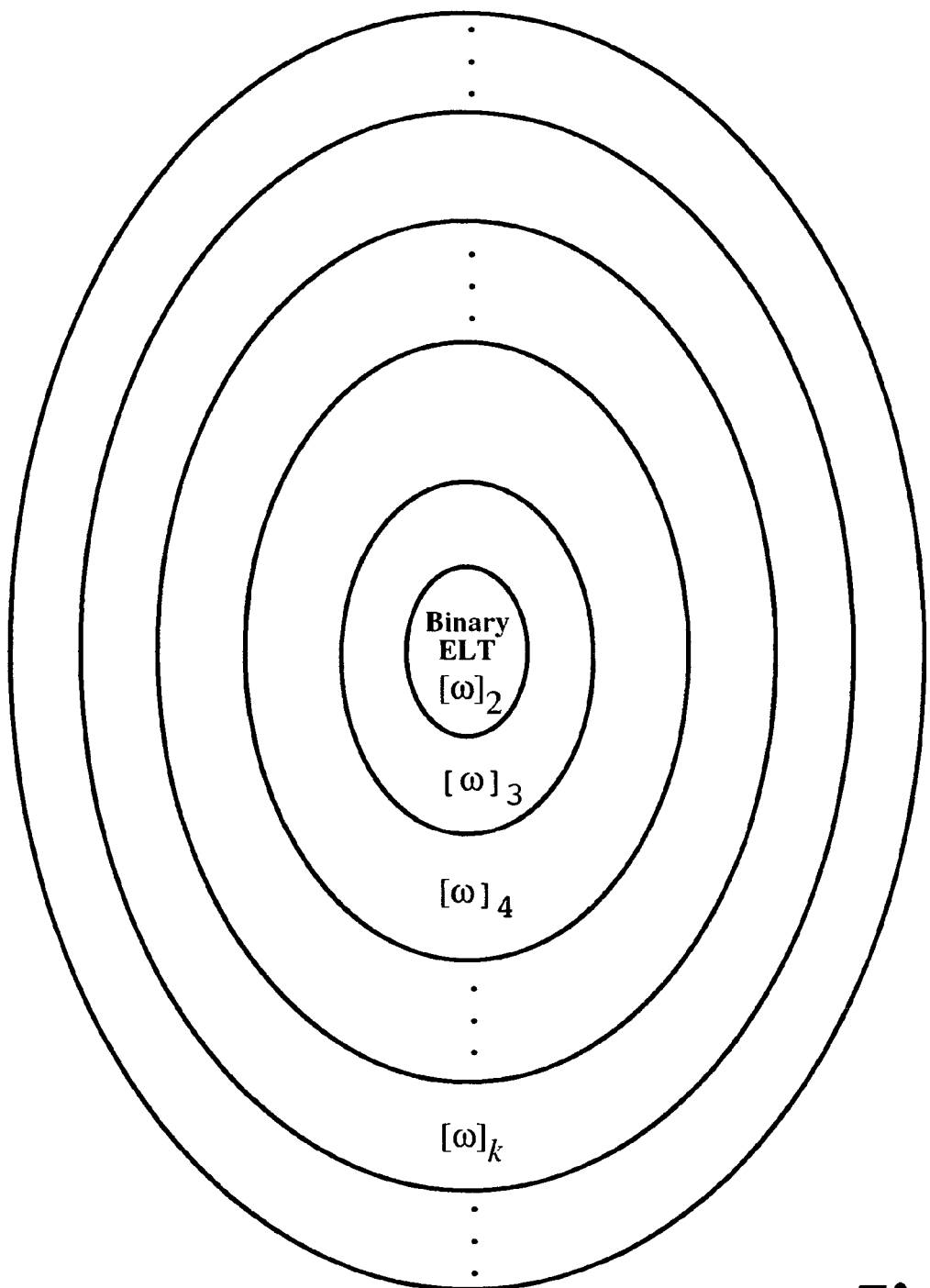
FIG. 5 is a schematic diagram illustrating all N-valued rooted, unordered, edge-labeled trees, where N is a natural numeral greater than or equal to 2.

Previously, an embodiment for manipulating binary edge labeled trees or BELTs was described in connection with U.S. provisional patent application 60/543,371. In that context, binary edge labeled trees comprise finite rooted, unordered two valued edge labeled trees. Thus, for the particular embodiment of binary edge labeled trees described, the two values comprise "0" and "1," although alternately they could comprise A and B, for example, or any other two values. Referring now to FIG. 5, a Venn diagram 500 is illustrated providing the set of all edge labeled trees, structured or organized in a particular manner here. In the center of the diagram, binary or two valued edge labeled trees are depicted as a subset. Furthermore, as illustrated, two valued edge labeled trees are also depicted as a subclass or subset of three valued edge labeled trees. Likewise, three valued edge labeled trees are depicted as a subclass or subset of four valued edge labeled trees and so forth. Thus, depending at least in part on the particular set of distinct values employed to label the edges, an edge labeled tree that employs two distinct values may comprise an example of a three valued edge labeled tree in which one of the values is specifically not employed in the particular tree. As shall be explained in more detail hereinafter, this raises a question regarding proper interpretation of the data that the tree may represent or store. More specifically, an identical tree may represent different data depending at least in part on whether the tree is "viewed" as, to continue with this example, a two valued edge labeled tree or a three valued edge labeled tree. Thus, in this embodiment, we refer to this as the "view" of the particular tree. For example, a two valued edge labeled tree is referred to as view 2 and a three valued edge labeled tree is referred to as view 3, although, for example, the particular tree may not contain three different values. The view in this embodiment refers to the set of distinct values from which the labels may be selected, as previously described. FIG. 5 therefore depicts the set of all edge labeled trees as the union of all such edge labeled trees in which the edge values are selected from a set having a specific number of distinct values.

Previously in U.S. provisional application 60/543,371, an embodiment was demonstrated in which an association existed between natural numerals and binary edge labeled trees. For this particular embodiment, similar associations also exist, here between any N valued edge labeled tree and the natural numerals, where N is a numeral. Of course, many different associations are possible and the claimed subject matter is intended to cover all such associations regardless of the particular embodiment. Thus, for example, three valued edge label trees may be converted to numerals, four valued edge labeled trees may be converted to numerals and so forth. Thus, manipulations, such as those previously described, for example, in aforementioned provisional U.S. patent application 60/543,371, as well as additional manipulations, may be applied to N valued edge labeled trees, as described in more detail hereinafter.

As suggested in previously referenced U.S. provisional application 60/543,371, in one particular embodiment, when converting between binary edge labeled trees and numerals, a relationship was found to exist between a "push" operation and non-composite numerals. Thus, in this context, it may be convenient to define an operation indexed by the natural numerals that provides in ascending order the non-composite numerals, although, of course, the claimed subject matter is not limited in scope in this respect. Such an operation is depicted specifically in FIG. 6. As described in more detail hereinafter, this operation is also convenient in this context in connection with edge labeled trees of any number of distinct edge values.

As previously suggested in aforementioned U.S. provisional patent application No. 60/575,784, a set of congruence operations on the set of tree expressions may be isomorphic to the set of finite, rooted, unordered binary edge labeled trees. Thus, or more particularly, under such an isomorphism, in the particular embodiment, a one-to-one relationship between the equivalence classes that satisfy the tree expressions and the finite, rooted, ordered binary edge labeled trees may exist.

Thus, beginning with binary edge labeled trees or finite rooted unordered two valued edge labeled trees, but continuing to edge labeled trees of higher numbers of values, such as, for example, three valued edge labeled trees, four valued edge labeled trees and so forth, for this embodiment, a similar association or relationship between tree expressions and edge labeled trees may be constructed. Thus, for this embodiment, with a set of operations that satisfies a set of tree expressions an isomorphism with a set of finite routed unordered N valued edge labeled trees results in a similar one to one relationship between the equivalence classes that satisfy the tree expressions and the edge labeled trees themselves. Likewise, by demonstrating that these tree expressions are also isomorphic with natural numerals, tree manipulations are able to be constructed for edge labeled trees using natural numerals, as had similarly been done for binary edge labeled trees. Thus, as shall become more clear hereinafter, manipulating tree expressions is isomorphic to manipulating numerals for this particular embodiment.

Previously, binary edge labeled trees have been discussed. For purposes of illustration, it shall instructive to now discuss another type of edge labeled tree, such as four valued edge labeled trees. For example, FIG. 9 corresponds to finite rooted unordered four valued edge labeled trees, which were also discussed previously with respect to FIG. 4. Thus, for this example embodiment, an algebra may be constructed that is isomorphic to the natural numerals for such four valued edge labeled trees. Likewise, similar algebras may be constructed by use a similar set of tree expressions, as shown, for example, by FIGS. 7, 8, 10 and 11. The similarity of these expressions allows us to write a schema or generalized description and thereby cover all such similar algebras.

Thus, similar to an approach previously described, FIG. 9 provides a set of constants and operators here, constants 0 and 1, monadic operators A, B, C, and D and binary operator *. Thus, we designate this algebra with the signature <2,4,1> as a result. The expressions for this particular embodiment are provided in FIG. 9. The first expression, 910, denotes communitivity and the second expression, 920, denotes associativity. Likewise, the next two expressions, 930, define the relationship of the merger of the constants with any other value. The next four expressions, 940, define the monadic operators A, B, C and D.

Thus, for this embodiment, these expressions therefore define a set of edge labeled trees with particular properties. Specifically, the properties are isomorphic to the natural numerals. Thus, as shall be demonstrated further, for this embodiment, four valued edge labeled trees, for example, may be manipulated using natural numerals.

Figure 13:

At least in part because natural numerals are isomorphic to N valued trees, a way to depict this relationship for this embodiment is illustrated by FIGS. 12 and 13. Previously, a particular view for a particular edge labeled tree, for this embodiment, was discussed. In these figures, each column represents a different potential view for a set of edge labeled trees for this embodiment. Likewise, each row provides the edge labeled tree in the view corresponding to the column for the natural number on the left-hand side of FIG. 12.

For example, column one shows the trees with for two valued edge labeled trees edges, otherwise referred to as binary edge labeled trees. Thus, as previously described, no nodes corresponds to "0". Continuing, a single node corresponds to "1" or to "root". Likewise, the numerals two and three in this view turn out to be push operations. In this case, the numeral 2 is the tree corresponding to the A push of one denoted A(1). Likewise, the numeral 3 is the tree corresponding to the B push of one, denoted B(1).

For this embodiment, these relationships may also be confirmed by referring back to FIG. 7. Here, the operations A(x) and B(x) as defined in terms of the function, previously defined in connection with FIG. 6. Thus, using these expressions, to determine the push of 1 denoted A(1), as provided in FIG. 7, this is Q((2*1)−2). This provides Q(0) or the value 2, as demonstrated from FIG. 6. As similar result may be obtained for B(1). Referring to FIG. 7, this corresponds to Q((2*1)−1), or Q(1), again from FIG. 6, the value 3.

A similar relationship may be established for three valued edge labeled trees, described by the expressions provided in FIG. 8, for example. Referring again to FIGS. 12 and 13, the edge labeled trees corresponding to these expressions are depicted in the second column. It is noted that the tree structures using this notation are the same between the first column and the second column for the numerals from zero to four. However, a difference is noted between the first column and the second column at numeral 5. Thus, for view 3, the numeral 5 is the C push of 1. More particularly, again referring to FIG. 8, C(1) equals Q(3*1)−1), or Q(2). From FIG. 6, the corresponding value is 5, as previously suggested. Similarly, looking at column 3 of FIG. 12, for view 5, the D push of 1 is numeral 7.

Thus, for this embodiment, regardless of the "view" of the edge labeled trees, there is a unique one to one correspondence, here, an association embodiment, between the natural numerals and that set of edge labeled trees. This embodiment, therefore, provides the capability to manipulate and combine edge labeled trees of different view. For example, for two edge labeled trees from two different views, one of the edge labeled trees may be converted so that the two edge labeled trees are in the same view. Once in the same view, the trees may be manipulated, such as by a merger, for example. Likewise, in an alternative embodiment, both trees may be converted to numerals, the numerals may be manipulated and then the manipulated numerals may be converted back to edge labeled trees of a particular view. Likewise, the edge labeled trees may be converted to any desirable view.

It is likewise noted that for this particular embodiment one way of manipulation an edge labeled tree is to apply a push operation to the edge labeled tree. Likewise, as previously described, for this embodiment, a push operation comprises adding an edge and labeling it. Assuming for this embodiment that the labels for the edge labeled tree comprise numerals, the label for a particular view will be a numeral that is less than the view itself. For example if the view is 5 than the set of distinct values to label an edge comprises 0, 1, 2, 3 or 4. Of course, this is merely one potential embodiment and the claimed subject matter is not limited in scope in this respect. For example, as previously described, letters may be employed. Likewise, any set of values where each value is distinct may be employed and remain within the scope of the claimed subject matter.

A similar set of manipulations may be applied to node labeled trees rather than edge labeled trees. Thus, node labeled trees may be represented in different views, may be converted to the same view, may be converted to numerals, combined, and converted back to a node labeled tree of a particular view. Likewise, a push operation may be applied to a node labeled tree, as previously described for edge labeled trees.

Although the claimed subject matter is not limited in scope in this respect, one technique for implementing this approach may be to apply a table look up approach. For example, a table providing different embodiments associating different views to natural numerals may be employed. Of course, the claimed subject matter is not limited in scope in this respect. For example, instead, a table look-up may be employed for the operation Q and the expressions previously described may be applied to perform manipulations, such as those previously illustrated, for example.

Techniques for performing table look-ups are well-known and well-understood. Thus, this will not be discussed in detail here. However, it shall be appreciated that any and all of the previously described and/or later described processing, operations, conversions, transformations, manipulations, etc. of strings, trees, numerals, data, etc. may be performed on one or more computing platforms or similar computing devices, such as those that may include a memory to store a table as just described, although, the claimed subject matter is not necessarily limited in scope to this particular approach. Thus, for example, a hierarchy of data, such as a tree as previously described, for example, may be formed. Likewise, operations and/or manipulations, as described, may be performed; however, operations and/or manipulations in addition to those described or instead of those described may also be applied. It is intended that the claimed subject matter cover such embodiments.

As described in prior embodiments, one technique for manipulating edge labeled trees includes converting such trees to natural numerals, performing manipulation of the natural numerals, and converting back to an edge labeled tree of a particular view. Furthermore, as described above, one technique for such conversions may include table look-up, as described above. Likewise, in another embodiment, it may be possible to convert a natural numeral directly to an edge labeled tree using a table look-up for the operation Q, previously described. For example, if it were desirable to convert the natural numeral 61 to an edge labeled tree in view 4, the numeral could be factored and the factors converted to trees. In this example, 61 is a non-composite, so, using a table look-up, Q(17) provides 61. Thus, 61 is a push of 17. Using the expressions provided on FIG. 9, for example, we may determine whether 61 is the A, B, C, or D push of 17, and so forth. Likewise, for this particular embodiment, previously, an example of converting between an edge labeled tree of a particular view and a natural numeral was provided.

As previously described an embodiment in accordance with the claimed subject matter may include edge labeled trees of a distinct number of potential identifying labels N, N being a natural numeral. Likewise, as previously described, an example of an embodiment of such a tree is 400 illustrated in FIG. 4. Likewise, by employing the symbolic expression below tree 400 in FIG. 4, as previously described, for this embodiment, it is possible to convert this particular tree, which we previously described as a tree of view 4, into a natural numeral. By this mechanism, for this particular embodiment, it is possible to perform tree manipulations by manipulating natural numerals. Likewise, for this particular embodiment, edge label trees may be converted to strings and manipulation of such strings may provide tree manipulations as well, as described in more detail hereinafter.

For example, in this embodiment, FIG. 19 provides an embodiment of an association between natural numerals, on the left-hand side, and a set of strings, on the right-hand side. Of course, as has been previously indicated, the claimed subject matter is not limited in scope to this particular association embodiment and many other association embodiments are included within the scope of the claimed subject matter. Nonetheless, there are aspects of this particular embodiment worthy of further discussion. For example, FIG. 18 provides a set of rules that permit conversion between the natural numerals and this particular association embodiment of strings. Again, it is noted that the claimed subject matter is not limited in scope to this particular embodiment. However, as shall be discussed in more detail hereinafter, a feature of this particular embodiment is the ability to represent push operations and merger operations, such as those previously described in connection with edge labeled trees, using strings.

FIG. 18 provides for this embodiment a set of rules for converting natural numerals to strings. As illustrated, and as is similar to the approach previously employed in conjunction with edge labeled trees, the numeral 0 is assigned an empty string, whereas the numeral 1 is assigned a pair of corresponding left-right brackets. This is indicated by expressions 1810. It is likewise noted that in this context we include the numeral zero when referring to the natural numerals. Likewise, as is illustrated by expression 1820 in FIG. 18, a numeral that is two times the numeral X is represented as the string for X plus an extra set of left-right brackets in front of the brackets for the numeral X. Likewise, expression 1830, denoted the odd non-composite rule, is similar in concept to a push operation, previously described in connection with edge labeled trees. If a natural numeral is a non-composite numeral, it is assigned the string for the natural number index of that non-composite, as defined by the operation shown in FIG. 6 but then surrounded by an additional left-hand bracket on the left-hand side and an additional right hand bracket on the right-hand side, as depicted in FIG. 18. Further, expression 1840 comprises the merger rule in which the multiplication of two natural numbers is simply the combination of the strings for those natural numbers represented side by side or adjacent to one another. It is further noted, although the claimed subject matter is not limited in scope in this respect, that a convention may be introduced to ensure that a unique association exists between particular numerals and strings.

For example, one such convention may be that the smaller of the two numerals is the string on the left, for example, although, the claimed subject matter is not limited in scope to such a particular approach. From these rules, it is possible to construct the strings shown in FIG. 19 that correspond with the natural numbers. Again, it is noted that this is a particular association embodiment and the claimed subject matter is not limited in scope in this respect. Thus any one of a number of other rules for constructing strings might have been employed and remain within the scope of the claimed subject matter.

A feature of this embodiment, although the claimed subject matter is not limited in scope in this respect, is that the strings shown in FIG. 19 may likewise be associated with unitary edge labeled trees, that is, strings that employ a single unitary label for all of the edges of the tree. To be more specific, the set of distinct values from which labels for edges are chosen is a set of one value only. Alternatively, such trees need not have their edges labeled with any value, similar in respects, to the strings themselves. Thus, as described previously in which an edge labeled tree of a particular view may be converted to a natural numeral for manipulation purposes; likewise, such an edge labeled tree may be converted to, for example, for this particular embodiment, a string corresponding the edge labeled tree and the string may be manipulated in place of manipulating a natural numeral.

Thus, this particular embodiment provides an approach in which edge labeled trees may be manipulated by converting between different views, as previously described. Likewise, edge labeled trees may be manipulated by converting to natural numerals, manipulating the natural numerals, and converting back to edge labeled trees of a particular view. Furthermore, edge labeled trees may be manipulated by converting to corresponding strings, manipulating the strings, and then converting back to edge labeled trees. It is noted that the claimed subject matter is not limited to these particular approaches or to employing any one of these approaches alone. The desirability of the approach will depend at least in part and vary with a variety of factors, including storage capabilities, processing capabilities, the particular application and the like.

A related issue in connection with embodiments of edge labeled trees, such as those previously described, for example, is the ability to traverse or navigate such edge labeled trees. In particular, it may prove desirable to traverse or navigate such trees, for example, without necessarily traversing every edge and/or node of the particular tree. However, techniques known for navigating or traversing trees, as a general principle, involve traversing or navigating all the nodes and/or edges of the tree or at least substantial portions that it might be desirable to avoid due to the limitations of time, resources, processing capability or the like. See, for example, *Discrete Mathematics in Computer Science*, D. F. Stanat and D. F. McAllister, Prentice-Hall, 1977, Section 3.2, "Tree Traversal Algorithms," p. 140.

Therefore, as shall become more clear hereinafter, it may be desirable to have a technique for identifying specific edges and/or nodes of an edge labeled tree out of all the edges and/or nodes of the tree. One such approach is referred to in this context as tagging the particular edge and/or nodes. By tagging edges and/or nodes, it may be possible to specify a route or provide a mechanism for navigating around portions of the tree without traversing every node and/or edge. Likewise, as shall become more clear, tagging may also provide the ability to specify the order in which those nodes and/or edges are to be traversed.

Without intending to limit the scope of the claimed subject matter, the desirability of having such capabilities might arise in a number of different situations. For example, in connection with a data base system, for example, it may be desirable to locate specific data quickly without traversing the entire tree structure or nearly the entire structure of the data base. Alternatively, in a commercial process that may structured or represented as a tree and implemented by computing device, for example, it may be desirable to skip a portion of the tree to reach another node or edge at another point in the process, depending, for example, at least in part upon what has occurred in the process to that point in time. Again, these are simply examples and many other examples in which the ability to traverse nodes and/or edges of a tree in a specified order and to traverse only those nodes and/or edges may prove desirable.

Figure 20:
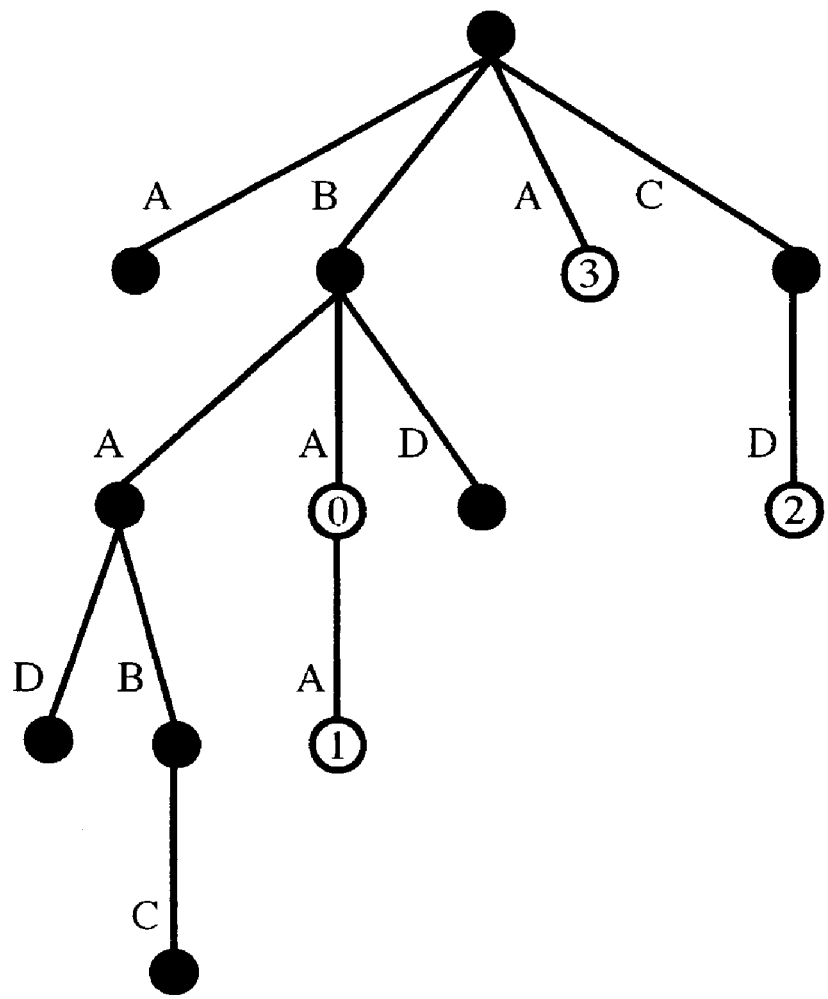
FIGS. 20-24 are a sequence of operations illustrating a technique to implement one embodiment of a method of tagging a tree.
Figure 21:
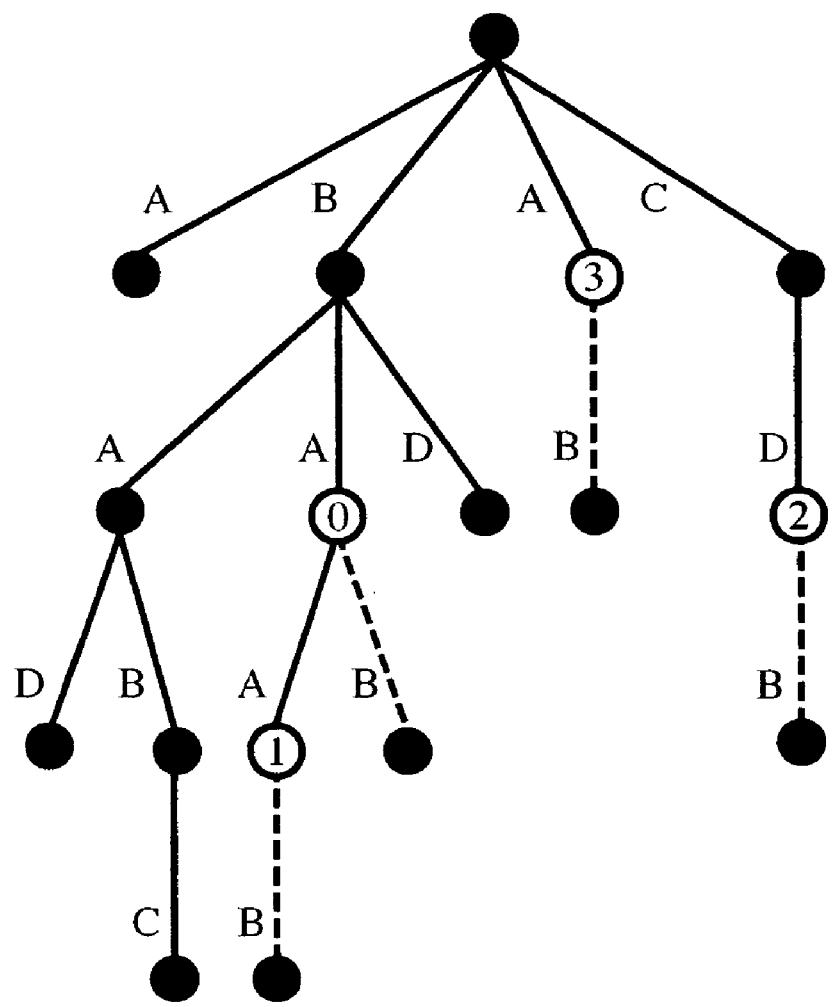

In accordance with one embodiment of the claimed subject matter, a method of traversing an edge labeled tree may include locating specific nodes of the tree that are to be traversed. For example, referring to FIG. 4, assuming tree 400 comprise an edge labeled tree in which it is desirable to traverse specific nodes, FIG. 20 provides another representation of tree 400 in which specific nodes are designated to be traversed and, likewise, the desired order of traversal is also provided.

In this particular embodiment, the nodes of the tree that are to be traversed shall each have a corresponding tag. Such tags, in this particular embodiment, for example, are capable of being identified by a computing device that has been suitable programmed. Thus, the tags shall in essence, for this embodiment, become incorporated into the tree structure, as shall be described in more detail hereinafter.

For this specific embodiment, creation of a tag may be illustrated by FIGS. 21 to 24. For example, referring to FIG. 21, for the nodes to be traversed, an edge labeled B is attached and another node is provided supporting that edge labeled B. Again, it is noted that the claimed subject matter is not limited in scope to this particular embodiment. For example, here, the label B was selected due at least in part to the structure of this particular tree, although, alternatively a different label may have been employed. For example, a label that has not been employed in the tree, such as E, for example, might have been employed. Nonetheless, continuing with our example in FIG. 22, sub-trees are attached to the "new" nodes where the sub-trees, in this particular embodiment, are intended to designate the order in which the particular nodes of the initial tree are to be traversed. Thus, for example, from the node designated by the natural numeral 0, an empty sub-tree has been provided. In contrast, a sub-tree corresponding to 1 has been employed to tag the node designated by the natural numeral 1. Likewise, a sub-tree corresponding to the natural numeral 2 has been employed to tag the node having the natural numeral 2 and so forth.

Figure 22:
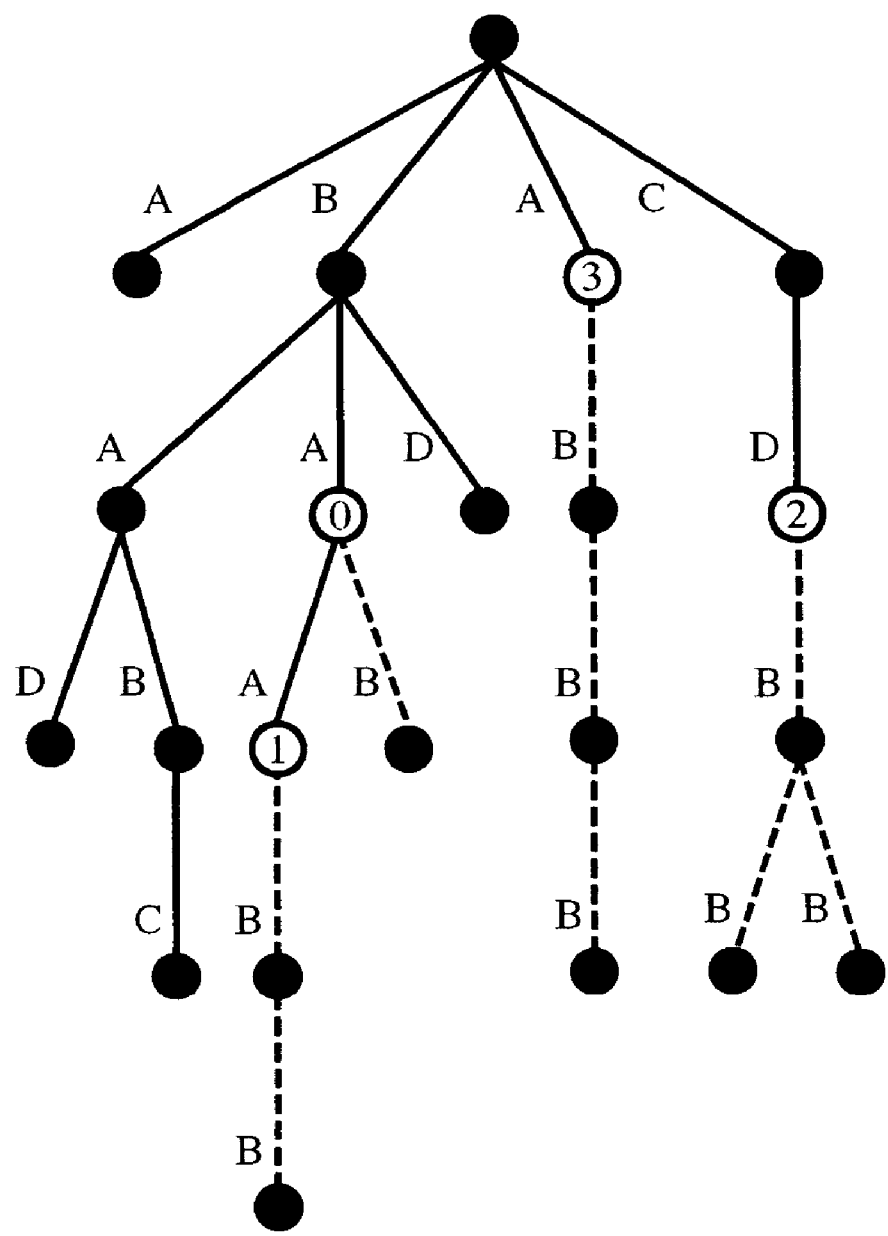

At this point, it is to be noted, for this particular embodiment, that there is a correspondence between the sub-trees employed in FIG. 22 and the strings depicted in FIG. 19, although this is a particular embodiment and the claimed subject matter is not necessarily limited in scope in this respec. More specifically, depending upon the particular embodiment, it may be appropriate to employ tags to designate the particular nodes to be traversed in which the tags comprised strings. Those strings may then be converted to sub-trees. To be more specific, for this particular embodiment, the strings denoted in FIG. 19 may be converted to unitary valued trees, as previously described. Thus, the strings may be converted to trees in which the edges are labeled with a single value. For example, a correspondence exists and is apparent by inspection between the sub-tree for the natural numeral 2 in FIG. 22 and the string for the natural numeral 2 in FIG. 19. Likewise, the correspondence for natural numeral 3 between FIG. 22 and FIG. 19 is likewise apparent by inspection. Thus, the strings provide a mechanism for providing sub-trees that may operate as tags in which the tags may be identified by labeling the edges with a value that either is not employed in the tree elsewhere or a value that is not repeated in the tree so that it is clear which portions of the tree comprise tags and which portions of the tree do not comprise tags.

Figure 23:
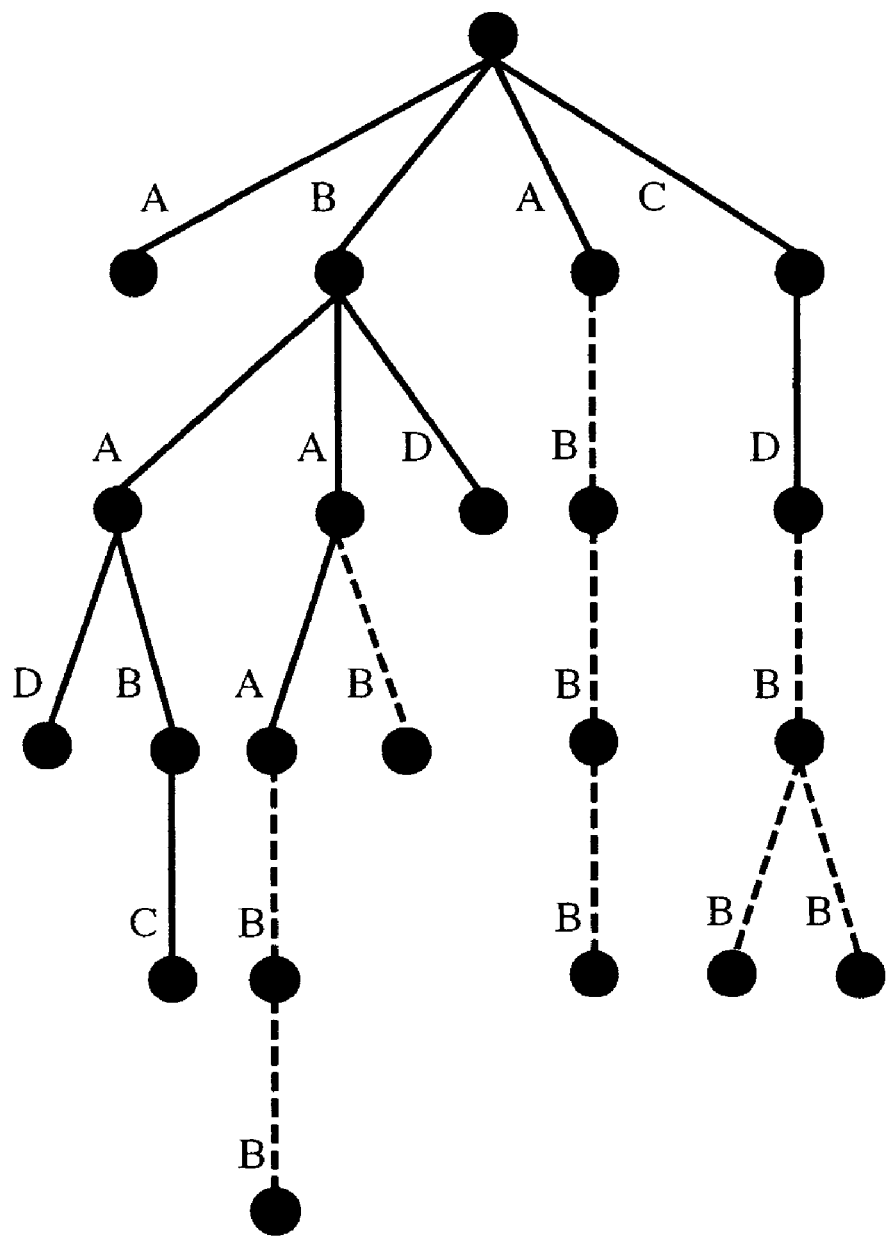
Figure 24:
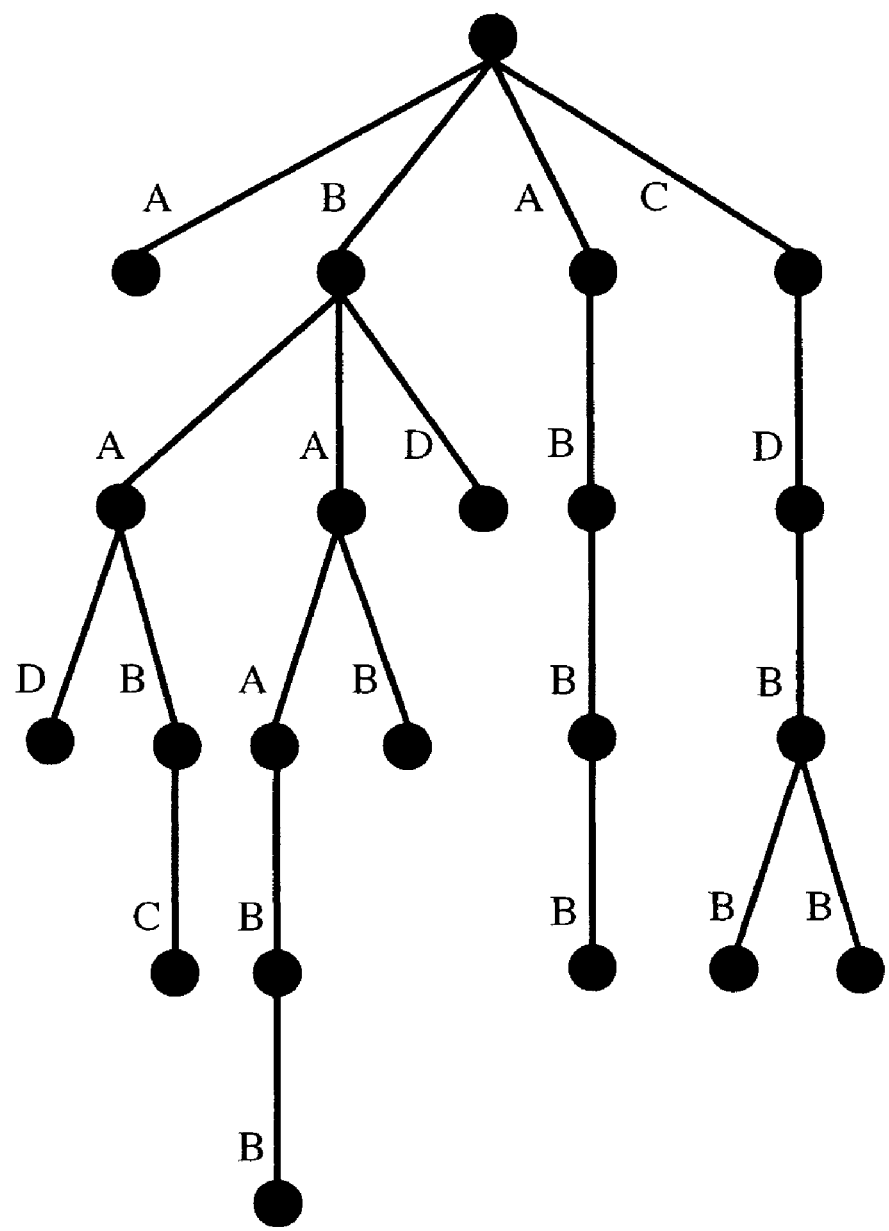
Figure 25:
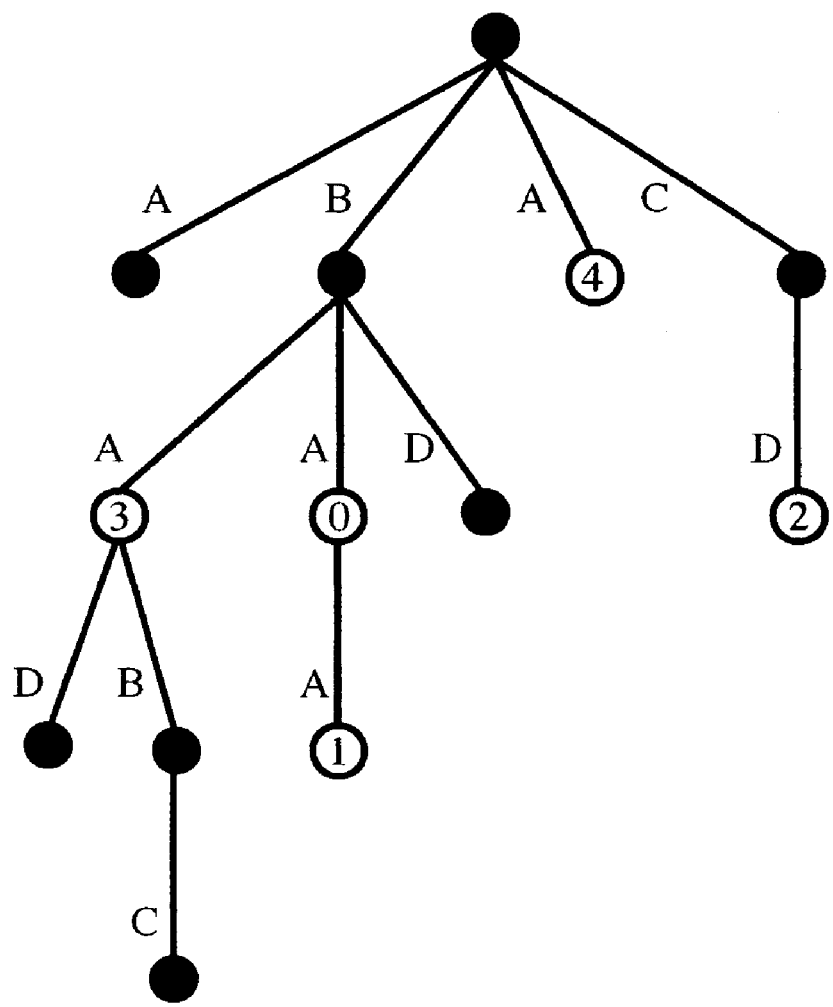
Figure 26:
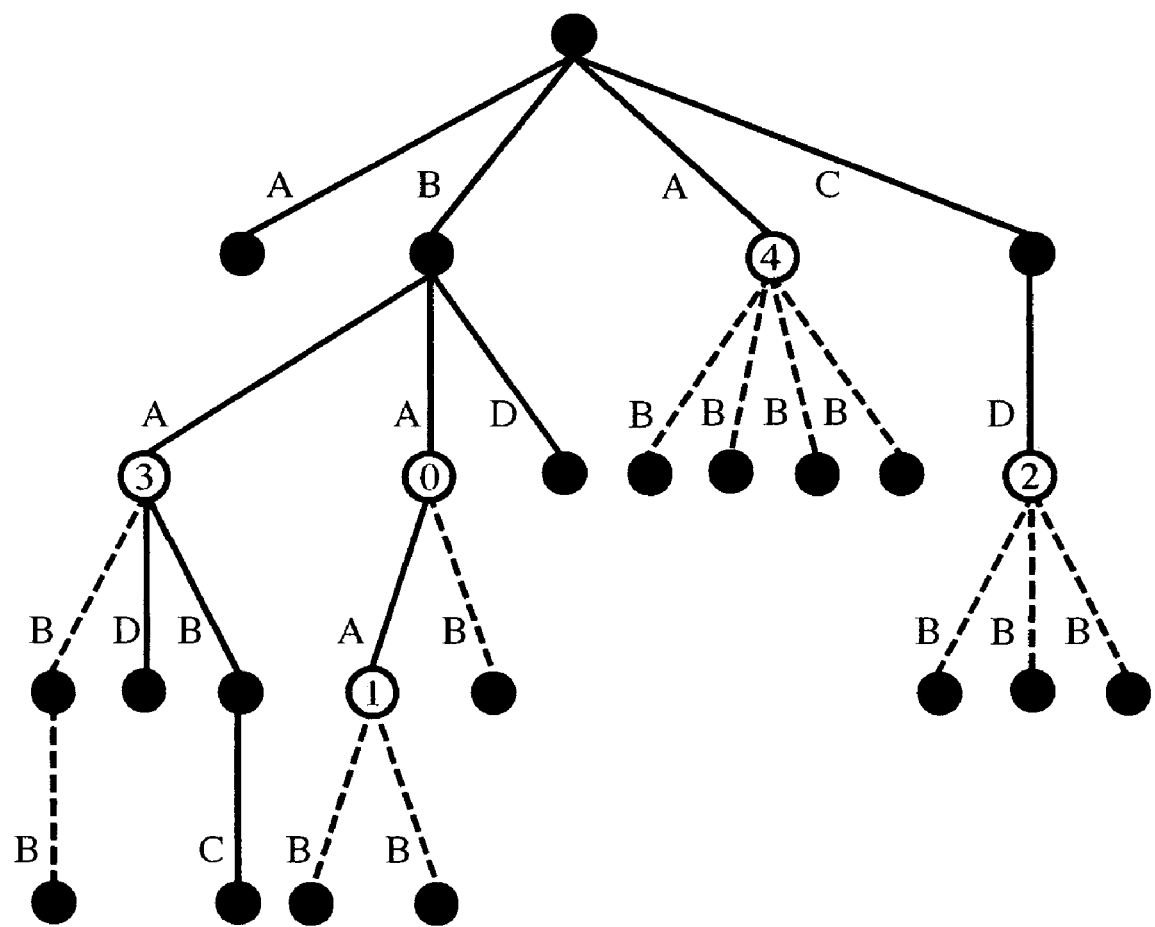
Figure 27:
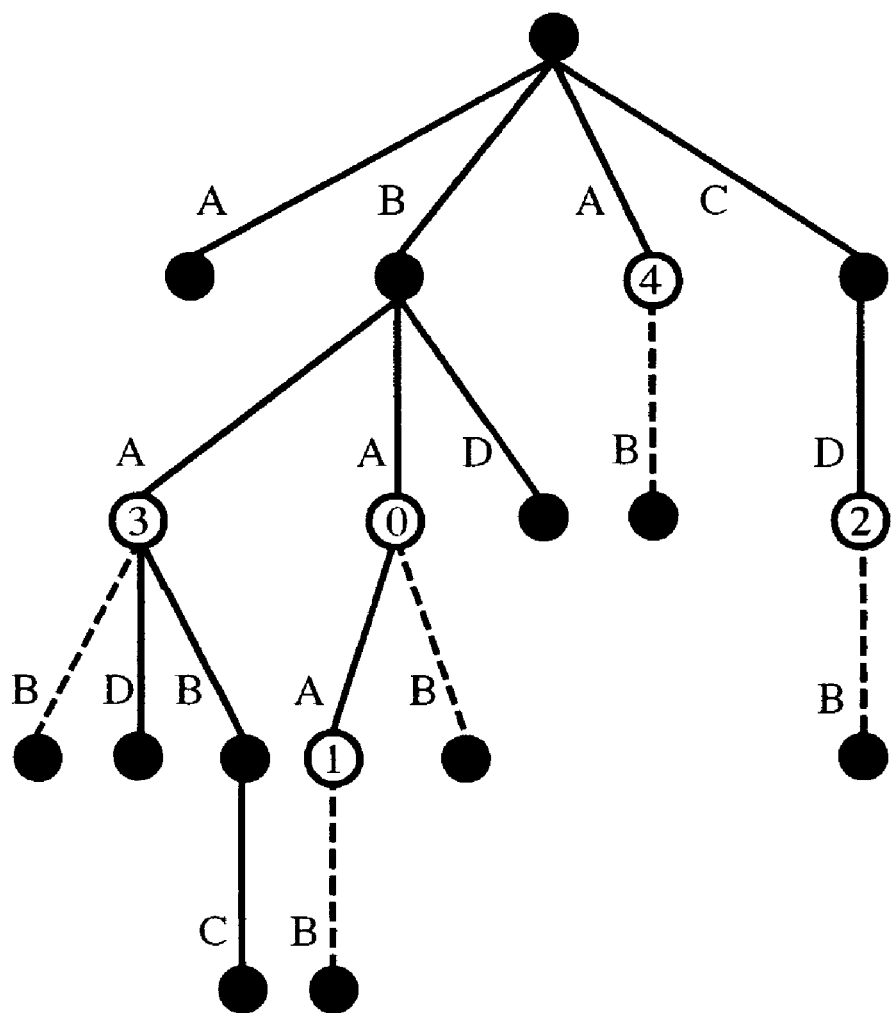

Comparing FIGS. 22, 23, and 24, it is now apparent how a tree may be constructed in which incorporated into the tree is information specifying the traversal of specific nodes, including the order in which those nodes are to be traversed. More specifically, when the tree illustrated in FIG. 24, for example, is stored, the sub-trees below each node are likewise stored, such as in a table for easy access, although the claimed subject matter is not limited in scope in this respect. Thus, the ability to pick those sub-trees that correspond to tag from those that do not is capable of being implemented based at least in part on the edge labels. To rephrase, the tags that are incorporated into the tree, such as the tree in FIG. 24, in this embodiment operate as pointers to the specific nodes to be traversed and also provide information regarding the order in which the nodes are to be traversed.

Yet another aspect of this particular embodiment, although, again the claimed subject matter is not limited in scope in this respect is that edge labeled trees that have been tagged in a particular view, such as in the manner previously described, for example, may be converted to natural numerals and/or strings, manipulated, and converted back to trees of the particular view without affecting the tags that have been incorporated into the tree. For example, if two trees in a particular view have tags indicating that the nodes of those trees are to be traversed in a specific order, those trees may be converted to natural numerals or to strings, manipulated, such as by merger, and converted back to a tree of the particular view. Yet, in the resulting tree, the tags and ordering shall remain intact. A reason this is possible relates to the underlying nature of the structure of the views, as previously described. For example, referring to view 4 and FIG. 9, as previously discussed, the edge labeled trees may be related to an algebra involving push and merger operations. From the isomorphism between the edge labeled trees of the particular view, here 4, and the natural numerals, the operations do not result in the particular operand trees from losing their inherent association for this embodiment. Thus, the operand trees that produce the resulting tree may always be recovered in an analogous manner that composite numerals may always be factored, for example.

FIGS. 25-28 illustrate an alternate embodiment to the one just described. Of course, the claimed subject matter is not limited to these embodiments. Many more are possible and are included within the scope of the claimed subject matter. However, for this particular embodiment, rather than employing tags that correspond to a particular natural numeral, here, the tags employed correspond to the index of the non-composite numerals that correspond to the factorization of the particular numeral providing the order to traverse the nodes. For example, in this embodiment, to double the particular numeral, as in going from the numeral 1 to the numeral 2, an additional labeled edge is added from the particular node. Likewise, similarly, a labeled edge is added in going from numeral 2 to numeral 4. For example, the label for the edges may comprise B, as previously, although the claimed subject matter is not limited in scope in this respect. However, for a non-composite numeral, a push operation is applied. Therefore, the numeral 3 is the push of the numeral 1. Of course, this is merely one particular embodiment and the claimed subject matter is not limited in scope in this respect.

Embodiments of a method of manipulating tree expressions have a variety of potentially useful applications. As described previously, trees provide a technique for structuring and/or depicting hierarchical data. Thus, for example, trees may be employed to represent language sentence structures, computer programs, algebraic formulae, molecular structures, family relationships and more. For example, one potential application of such a tree reduction technique is in the area of pattern matching See, for example, "A VLSI Architecture for Object Recognition using Tree Matching" K. Sitaraman, N. Ranganathan and A. Ejnioui; Proceedings of the IEEE International Conference on Application-Specific Systems, Architectures, and Processors (ASAP'02) 2000; "Expressive and efficient pattern languages for tree-structured data" by Frank Neven and Thomas Schwentick; Proceedings of the Nineteenth ACM SIGACT-SIGMOD-SIGART Symposium on Principles of Database Systems, May 2000. Thus, in pattern matching, substructures, in the form of a tree, for example, may be located within a larger structure, also in the form of a tree, referred to in this context as the target. This may be accomplished by comparing the structures; however, typically, such a comparison is complex, cumbersome, and/or time consuming.

Figure 14:
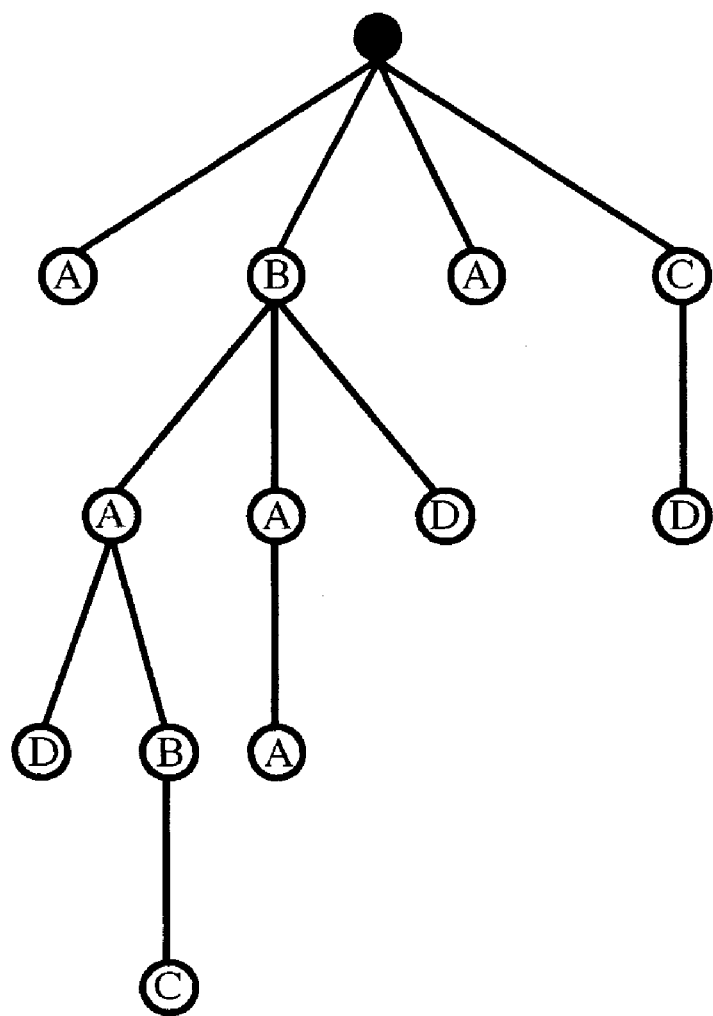
FIG. 14 is a schematic diagram of an unordered node labeled tree.

Of course, the claimed subject matter is not limited to unordered edge labeled trees. For example, as described in previously cited U.S. provisional patent application 60/543, 371, binary edge labeled trees and binary node labeled trees may be employed nearly interchangeably to represent substantially the same hierarchy of data. In particular, a binary node labeled tree may be associated with a binary edge labeled tree where the nodes of the binary node labeled tree take the same values as the edges of the binary edge labeled tree, except that the root node of the binary node labeled tree may comprise a node having a zero value or a null value. Thus, rather than employing edge labeled trees (ELTs), the previously described embodiments may alternatively be performed using node labeled trees (NLTs). One example of a NLT is illustrated in the diagram of FIG. 14 by tree 1400. As one example embodiment, operations and/or manipulations may be employed using edge labeled trees and the resulting edge labeled tree may be converted to a node labeled tree. However, in another embodiment, operations and/or manipulations may be performed directly using node labeled trees.

In accordance with the claimed subject matter, therefore, any tree, regardless of whether it is edge labeled, node labeled, non-binary, a feature tree, or otherwise, may be manipulated and/or operated upon in a manner similar to the approach of the previously described embodiments. Typically, different views shall be employed, depending at least in part, for example, upon the particular type of tree. Furthermore or alternatively, as described in the previously referenced U.S. provisional patent application 60/543,371, a node labeled tree in which the nodes are labeled with natural numerals or data values may be converted to an edge labeled tree. Furthermore, this may be accomplished with approximately the same amount of storage. For example, for this particular embodiment, this may involve substantially the same amount of node and/or edge data label values. However, for convenience, without intending to limit the scope of the claimed subject matter in any way, here, operations and/or manipulations and the like have been described primarily in the context of ELTs.

In another embodiment, however, a particular tree may include null types or, more particularly, some node values denoted by the empty set. An advantage of employing null types includes the ability to address a broader array of hierarchical data sets. For example, without loss of generality and not intending to limit the scope of the claimed subject matter in any way, a null type permits representing in a database or a relational database, as two examples, situations where a particular attribute does not exist. As may be appreciated, this is different from a situation, for example, where a particular attribute may take on a numeral value of zero. Again, as described in the previously referenced U.S. provisional patent application 60/543,371, a tree with nulls, as described above, may be converted to a tree without nulls; however, the claimed subject matter is not limited in scope in this respect, of course. Thus, it may be desirable to be able to address both situations when representing, operating upon, manipulating and/or searching for patterns regarding hierarchical sets of data.

Likewise, in an alternative embodiment, a node labeled tree, for example, may comprise fixed length tuples of numerals. For such an embodiment, such multiple numerals may be combined into a single numeral, such as by employing Cantor pairing operations, for example. See, for example, *Logical Number Theory, An Introduction*, by Craig Smorynski, pp, 14-23, available from Springer-Verlag, 1991. This approach should produce a tree to which the previously described embodiments may then be applied.

Furthermore, a tree in which both the nodes and the edges are labeled may be referred to in this context as a feature tree and may be converted to an edge labeled tree and/or a node labeled tree. For example, without intending to limit the scope of the claimed subject matter, in one approach, a feature tree may be converted by converting any labeled node with its labeled outgoing edge to an ordered pair of labels for the particular node.

In yet another embodiment, for trees in which data labels do not comprise simply natural numerals, such as, as one example, trees that include negative numerals, such data labels may be converted to an ordered pair of numerals. For example, the first numeral may represent a data type. Examples include a data type such as negative, dollars, etc. As described above, such trees may also be converted to edge labeled trees, for example. However, again, this is provided for purposes of explanation and illustration. The claimed subject matter is not limited in scope to employing the approach of the previously referenced provisional patent application.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive. For example, a display may be employed to display one or more queries, such as those that may be interrelated, and or one or more tree expressions, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

The invention claimed is:

1. A method of manipulating an edge-labeled tree (ELT) comprising:
converting a first ELT in a first view to a first ELT in a second view via a computer, wherein said first view is associated with a first number of distinct values in a first set of distinct values from which edge labels are selected for ELTs in said first view, wherein said second view is associated with a second number of distinct values in a second set of distinct values from which edge labels are selected for ELTs in said second view, and wherein said first number of distinct values is not identical with said second number of distinct values and wherein a one-to-one relationship exists between ELTs in particular views;
wherein ELTs are satisfying one or more operations of a set of tree expression properties that are isomorphic to operations on natural numerals, and the tree expression properties are isomorphic such that the ELTs are to be manipulated using natural numerals; and
applying the one or more ELT operations on said converted first ELT in said second view which are isomorphic with one or more operations on natural numerals; and wherein said first ELT in said second view includes nodes having tags specifying a traversing of said nodes.

2. The method of claim 1, and further comprising: applying a push operation to said first ELT in said second view.

3. The method of claim 2, wherein said tags remain intact after said push operation.

4. The method of claim 1, and further comprising: combining said first ELT in said second view with a second ELT in said second view.

5. The method of claim 4, wherein said second ELT includes nodes having tags specifying an order for traversing said nodes.

6. The method of claim 4, wherein said tags remain intact after said combining.

7. The method of claim 4, wherein said combining comprises:
converting said ELTs in said second view to strings;
combining said strings; and
converting said combined strings to an ELT.

8. The method of claim 7, wherein said converting said combined strings to the ELT comprises an ELT in said second view.

9. The method of claim 7, wherein said converting said combined strings to the ELT comprises an ELT in a view other than said second view.

10. An article comprising:
a storage media having stored thereon instructions that when executed by a processor, direct said processor to:
convert a first ELT in a first view to a first ELT in a second view,
wherein said first view is associated with a first number of distinct values in a first set of distinct values from which edge labels are selected for ELTs in said first view, wherein said second view is associated with a second number of distinct values in a second set of distinct values from which edge labels are selected for ELTs in said second view, and wherein said first number of distinct values is not identical with said second number of distinct values and wherein a one-to-one relationship exists between ELTs in particular views;
wherein ELTs are satisfying one or more operations of a set of tree expression properties that are isomorphic to operations on natural numerals, and the tree expression properties are isomorphic such that the ELTs are to manipulated using natural numerals;
apply the one or more ELT operations on said converted first ELT in said second view which are isomorphic with one or more operations on natural numerals; and
wherein said first ELT in said second view includes nodes having tags specifying a traversing said nodes.

11. The article of claim 10, wherein said instructions are further to be executed by the processor to apply a push operation to said first ELT in said second view.

12. The article of claim 11, wherein said instructions are further to be executed by the processor to result in said tags remaining intact after said push operation.

13. The article of claim 10, wherein said instructions are further to be executed by the processor to combine said first ELT in said second view with a second ELT in said second view.

14. The article of claim 13, wherein said instructions are further to be executed by the processor to result in said second ELT including nodes having tags specifying an order for traversing said nodes.

15. The article of claim 13, wherein said instructions are further to be executed by the processor to result in said tags remaining intact after said combining.

16. The article of claim 13, wherein said instructions are further to be executed by the processor to combine said first ELT in said second view with said second ELT in said second view by:
converting said ELTs in said second view to strings;
combining said strings; and
converting said combined strings to an ELT.

17. The article of claim 16, wherein said instructions are further to be executed by the processor to result in said converting said combined strings to the ELT comprising an ELT in said second view.

18. The article of claim 16, wherein said instructions are further to be executed by the processor to result in said converting said combined strings to the ELT comprising an ELT in a view other than said second view.

19. An apparatus comprising:
one or more processors and one or more memories;
said one or more processors and one or more memories being specifically programmed with instructions to:
convert a first ELT in a first view to a first ELT in a second view,
wherein said first view is associated with a first number of distinct values in a first set of distinct values from which edge labels are selected for ELTs in said first view, wherein said second view is associated with a second number of distinct values in a second set of distinct values from which edge labels are selected for ELTs in said second view, and wherein said first number of distinct values is not identical with said second number of distinct values and wherein a one-to-one relationship exists between ELTs in particular views;
wherein ELTs have one or more operations are satisfying one or more operations of a set of tree expression properties that are isomorphic to operations on natural numerals, and the tree expression properties are isomorphic such that the ELTs are to be manipulated using natural numerals;
apply the one or more ELT operations on said converted first ELT in said second view which are isomorphic with one or more operations on natural numerals; and
wherein said first ELT in said second view includes nodes having tags specifying a traversing said nodes.

20. The apparatus of claim 19, wherein said one or more processors and one or more memories are further specifically programmed with instructions to apply a push operation to said first ELT in said second view.

21. The apparatus of claim 20, wherein said one or more processors and one or more memories are further specifically programmed with instructions so that said tags remain intact after said push operation.

22. The apparatus of claim 19, wherein said one or more processors and one or more memories further specifically programmed with instructions to combine said first ELT in said second view with a second ELT in said second view.

23. The apparatus of claim 22, wherein said one or more processors and one or more memories are further specifically programmed with instructions so that said second ELT includes nodes having tags specifying an order for traversing said nodes.

24. The apparatus of claim 22, wherein said one or more processors and one or more memories are further specifically programmed with instructions so that said tags remain intact after said combining.

25. The apparatus of claim 22, wherein said one or more processors and one or more memories are further specifically programmed with instructions to combine said first ELT in said second view with a second ELT in said second view by:
converting said ELTs in said second view to strings;
combining said strings; and
converting said combined strings to an ELT.

26. The apparatus of claim 25, wherein said one or more processors and one or more memories further specifically programmed so that said converting said combined strings to the ELT comprises an ELT in said second view.

27. The apparatus of claim 25, wherein said one or more processors and one or more memories are further specifically programmed so that said converting said combined strings to the ELT comprises an ELT in a view other than said second view.

28. An apparatus comprising:
one or more processors and one or more memories;
wherein said one or more processors and one or more memories executes instructions comprising:
converting a first ELT in a first view to a first ELT in a second view, and wherein said first view is associated with a first number of distinct values in a first set of distinct values from which edge labels are selected for ELTs in said first view, wherein said second view is associated with a second number of distinct values in a second set of distinct values from which edge labels are selected for ELTs in said second view, and wherein said first number of distinct values is not identical with said second number of distinct values and wherein a one-to-one relationship exists between ELTs in particular views;

wherein ELTs are satisfying one or more operations of a set of tree expression properties that are isomorphic to operations on natural numerals, and the tree expression properties are isomorphic such that the ELTs are to be manipulated using natural numerals;

means for applying one or more operations on said converted first ELT in said second view which are isomorphic with one or more operations on natural numerals; and wherein said first ELT in said second view includes nodes having tags specifying a traversing said nodes.

29. The apparatus of claim 28, wherein said one or more processors and one or more memories further comprise means for applying a push operation to said first ELT in said second view.

30. The apparatus of claim 29, wherein said one or more processors and one or more memories further comprise means for said tags to remain intact after said push operation.

31. The apparatus of claim 28, wherein said one or more processors and one or more memories further comprise means for combining said first ELT in said second view with a second ELT in said second view.

32. The apparatus of claim 31, wherein said one or more processors and one or more memories further comprise means for said second ELT to include nodes having tags specifying an order for traversing said nodes.

33. The apparatus of claim 31, wherein said one or more processors and one or more memories further comprise means for said tags to remain intact after said combining.

34. The apparatus of claim 31, wherein said one or more processors and one or more memories further comprise means for said combining comprises:
   converting said ELTs in said second view to strings;
   combining said strings; and
   converting said combined strings to an ELT.

35. The apparatus of claim 34, wherein said one or more processors and one or more memories further comprise means for said converting said combined strings to the ELT comprising an ELT in said second view.

36. The apparatus of claim 34, wherein said one or more processors and one or more memories further comprise means for said converting said combined strings to the ELT comprising an ELT in a view other than said second view.

* * * * *